United States Patent [19]
Odaka

[11] 4,380,071
[45] Apr. 12, 1983

[54] METHOD AND APPARATUS FOR PREVENTING ERRORS IN PCM SIGNAL PROCESSING APPARATUS

[75] Inventor: Kentarou Odaka, Tokyo, Japan
[73] Assignee: Sony Corporation, Tokyo, Japan
[21] Appl. No.: 230,395
[22] Filed: Feb. 2, 1981
[51] Int. Cl.$^3$ ............................................. G06F 11/10
[52] U.S. Cl. ..................... 371/40; 360/38.1; 371/2; 371/4; 371/38
[58] Field of Search ............... 371/38, 39, 40, 4, 2; 360/38

[56] References Cited
U.S. PATENT DOCUMENTS

| | | | |
|---|---|---|---|
| 4,206,440 | 6/1980 | Doi et al. | 371/39 |
| 4,211,997 | 7/1980 | Rudnick et al. | 371/40 |
| 4,227,221 | 10/1980 | Kanazawa | 371/40 |
| 4,238,852 | 12/1980 | Iga et al. | 371/38 |
| 4,281,355 | 7/1981 | Wada et al. | 371/38 |
| 4,282,551 | 8/1981 | Kanazawa et al. | 371/38 |
| 4,306,305 | 12/1981 | Doi et al. | 371/38 |

*Primary Examiner*—Charles E. Atkinson
*Attorney, Agent, or Firm*—Lewis H. Eslinger; Alvin Sinderbrand

[57] ABSTRACT

A technique is disclosed for preventing errors in a PCM error-correction decoder of the type supplied with successive transmission blocks, each comprised of time-interleaved PCM, error-correction and error detection words, wherein the transmission blocks are selectively supplied from first and second data sources such that an error interval is produced as a function of the transition period during which the selection of the data sources is changed over from one to the other. According to this technique, the presence of an error in a supplied transmission block is detected, and each of the time-interleaved words included in that transmission block is identified as being erroneous. The transmission block is time de-interleaved to recover a de-interleaved block comprised of de-interleaved PCM and error-correction words. An erroneous PCM word in the de-interleaved block is corrected as a function of the remaining non-erroneous PCM and error-correction words in that de-interleaved block. However, the correction of a PCM word is inhibited if the block in which that word is disposed contains at least one word derived from the first data source and another word derived from the second data source.

21 Claims, 34 Drawing Figures

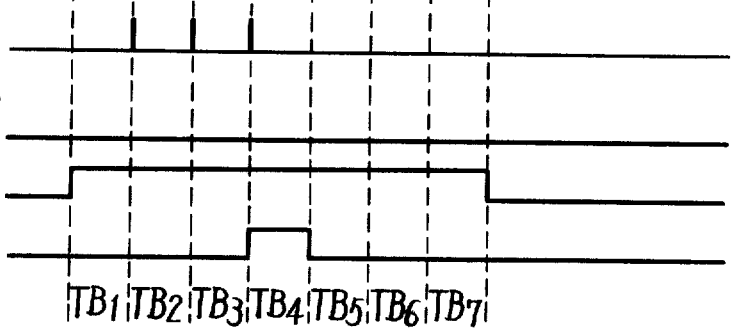

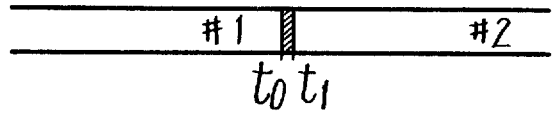
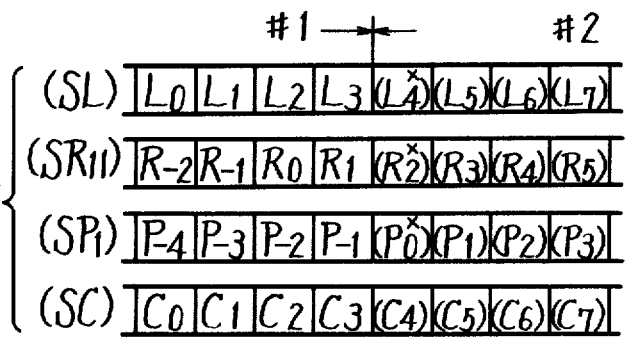
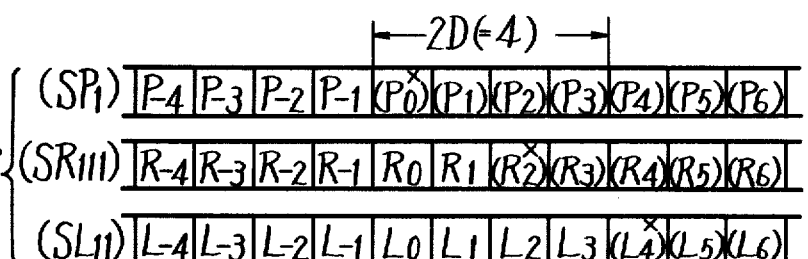
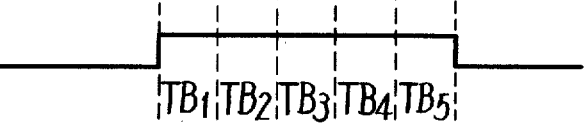

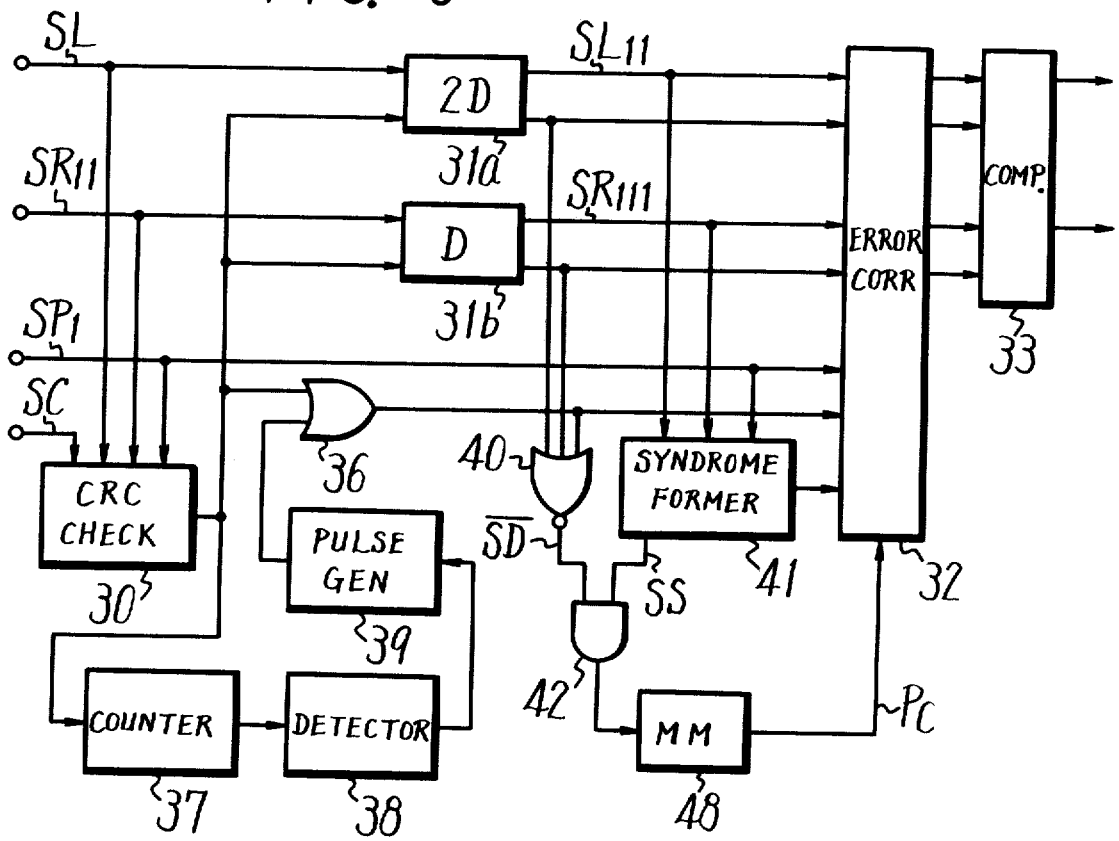
FIG. 6
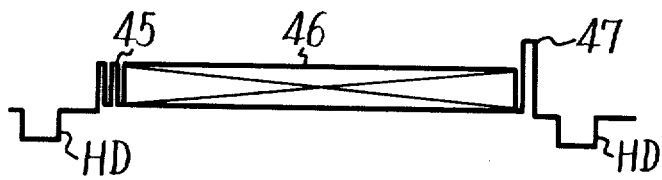
FIG. 11A
FIG. 11B

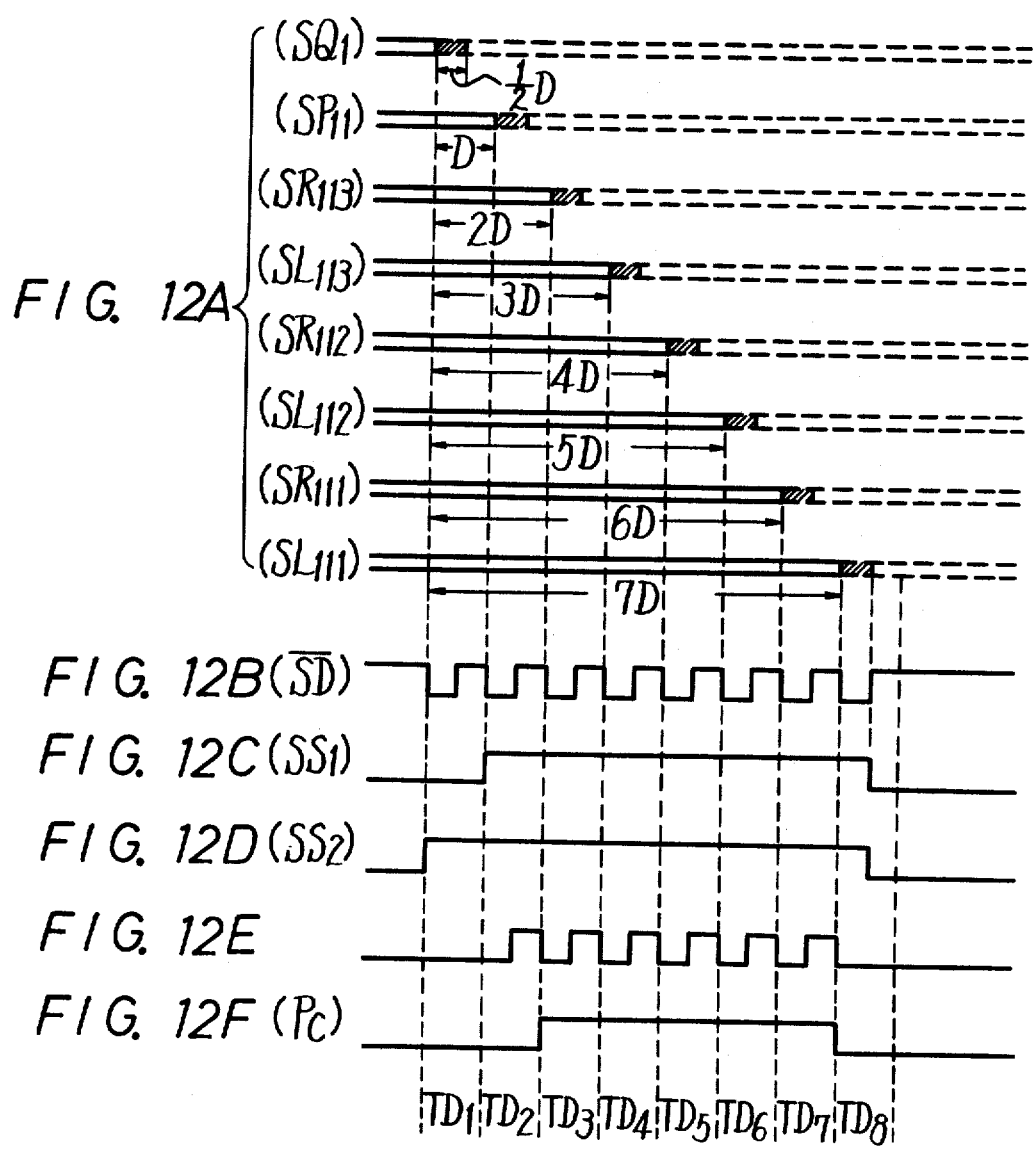

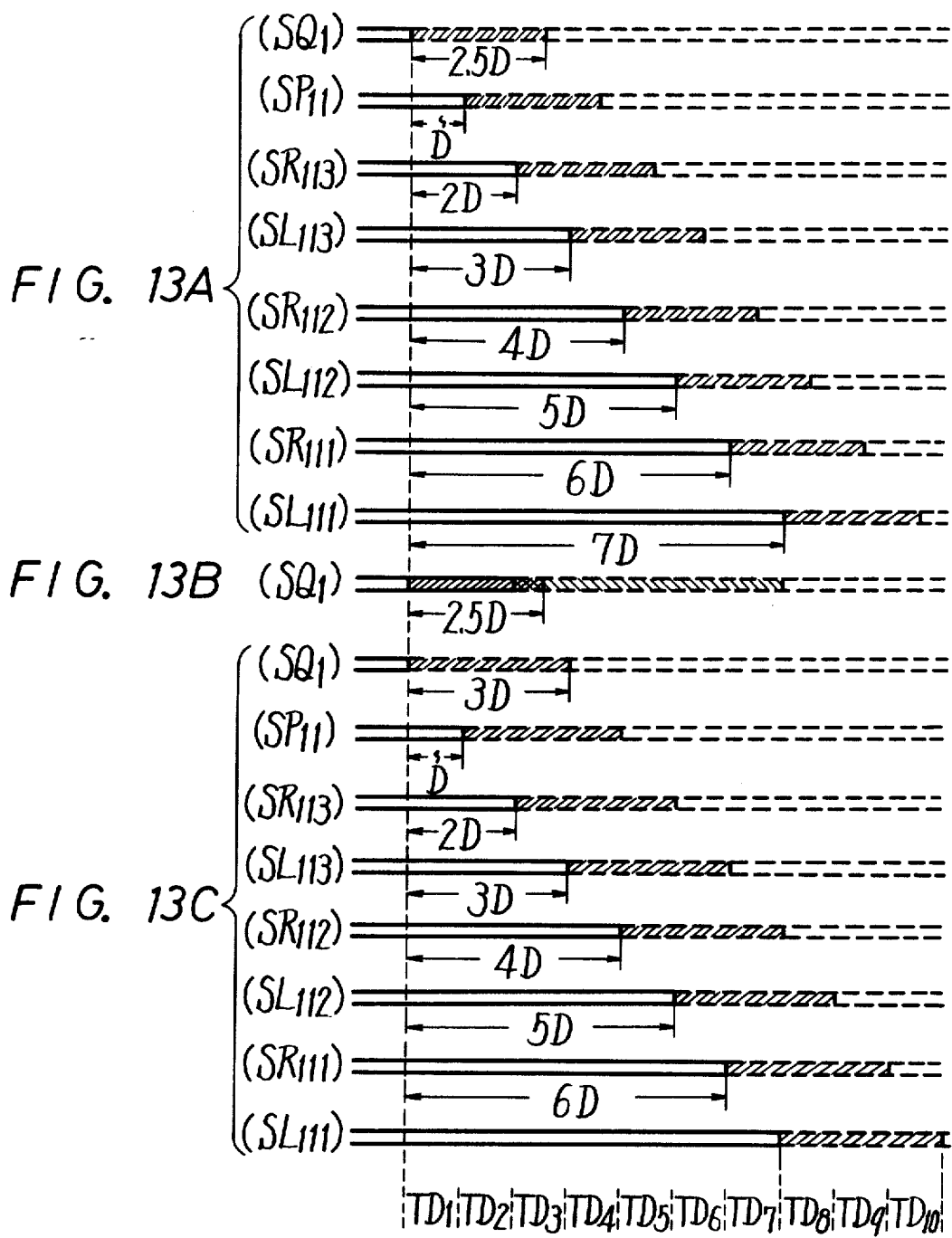

METHOD AND APPARATUS FOR PREVENTING ERRORS IN PCM SIGNAL PROCESSING APPARATUS

BACKGROUND OF THE INVENTION

This invention relates to a method and apparatus for preventing errors in PCM signal processing apparatus and, more particularly, to such a method and apparatus which is particularly adapted for use with PCM signal processing apparatus which receives PCM signals in a time-interleaved error-correction code from either of two different data sources.

Recently, digital techniques have been used for the transmission and recording of audio signals. For example, a rotary-head type video tape recorder (VTR), having a high recording density, can be used to record pulse code modulated (PCM) signals representing audio information. However, when a PCM-encoded signal is recorded and subsequently reproduced, the possibility exists that noise, interference, signal dropout, and the like may be present so as to destroy some of the reproduced PCM signals. Such loss of data may result in serious errors in the reproduced signal so as to interfere with satisfactory audio reproduction.

In order to minimize this problem of signal loss, error-correction codes have been proposed for use in encoding the PCM signals prior to recording or transmission. By using such error-correction codes, erroneous PCM signals which are reproduced or received may be corrected or compensated so as to avoid the aforenoted interference in audio reproduction.

One advantageous error-correction code which has been proposed for such PCM signals is the so-called time-interleaved code, some examples of which are described in copending application Ser. No. 86,677, filed Oct. 19, 1979 and now U.S. Pat. No. 4,306,305, and in copending application Ser. No. 195,625, filed Oct. 9, 1980, both assigned to the assignee of the present invention. Generally, in the time-interleaved error-correction code, plural channels of PCM signals are produced, each channel being constituted by a sequence, or series, of successive PCM words. These plural channels may be derived from an analog-to-digital converter which is used to digitize an input analog audio signal, such as a stereophonic signal. A data block is formed of one word in each channel, which words, typically, appear in parallel-by-word format. These parallel-appearing words are used to derive one or more error-correction words, such as parity words. Then, each PCM word in the data block, as well as the error-correction word (or words) is delayed by a respectively different time delay so as to effectively time-interleave the PCM and error correction words. These time-interleaved words, which are present in parallel-by-word form, are supplied, concurrently, to an error-detection word generator, such as a cyclic redundancy code (CRC) generator so as to produce an error detection word. This error detection word is combined with the time-interleaved PCM and error-correction words so as to form a time-interleaved transmission block. The time-interleaved transmission block then may be recorded, transmitted, or otherwise utilized.

When the time-interleaved transmission block is reproduced, or received, the various interleaved words, together with the error-detection word, are examined to determine if an error is present in this particular transmission block. Error detection codes, such as the CRC code, are well-known for providing this error-detection feature. If an error is detected in this transmission block, all of the interleaved PCM and error-correction words are identified as being erroneous, irrespective of whether each such word is, in fact, in error or correct. Then, these time-interleaved, identified, PCM and error-correction words are time de-interleaved so as to reconstruct the original data block. If a de-interleaved PCM word is identified as being erroneous, it can be corrected, by conventional error-correction techniques, such as by parity decoding, provided that none of the other words included in the same block are erroneous. If the reconstructed, de-interleaved block includes two error-correction words, then two erroneous PCM words included in that de-interleaved block can be corrected. The foregoing techniques are described more particularly in the aforementioned, copending applications.

By using the aforementioned time-interleaved encoding technique, effects due to a so-called burst error are minimized. The expression "burst error" generally refers to an error interval, wherein recorded or transmitted data is dropped out, that extends over a period of time sufficient to encompass a plurality of time-interleaved transmission blocks. However, even if all of the PCM and error-correction words included in a number of time-interleaved transmission blocks are distorted, upon reconstructing the original, de-interleaved transmission blocks, it is expected that, generally, only one word in the reconstructed block is distorted. That is, the time-interleaved encoding technique serves to disperse a burst error throughout many reconstructed blocks. Then, since only a single word in a reconstructed, de-interleaved block is erroneous, such errors may be corrected or compensated by conventional error-correction or compensation techniques.

It is advantageous to utilize PCM signal processing apparatus including the aforementioned time-interleaved encoder/decoder as an adapter to be quickly and simply connected to a VTR such that a conventional VTR may be used to record PCM-encoded audio signals. It also is advantageous to use this type of encoder/decoder to receive PCM signals from various sources. For example, the PCM decoder may be connected through a switching arrangement either to the playback section of a VTR or to the output of a PCM encoder. Depending upon the condition of the switch, time-interleaved transmission blocks are supplied to the decoder from one (the VTR) or the other (the PCM encoder) data source. Of course, since the time-interleaved transmission blocks supplied by both sources exhibit the same format, the decoder functions to decode the received transmission blocks, regardless of the particular source from which they are transmitted, and to reconstruct the original audio signals. In many instances, it may be desirable by the user of the apparatus to change over from one source (e.g. the VTR) to the other. During the transition interval, which exists for a finite time, the decoder effectively is supplied with erroneous transmission blocks. When these erroneous transmission blocks are time de-interleaved, in accordance with the usual procedure, a number of de-interleaved blocks, commencing with the first de-interleaved block at the beginning of the transition interval, contain some PCM and/or error-correction words derived from one source and other PCM and/or error-correction words derived from the other. Furthermore, one or more of the words included in such de-interleaved blocks are erroneous because they have been de-interleaved from those transmission blocks which were supplied during the transition interval. Nevertheless, if one of these PCM words in the de-interleaved block is erroneous, the error-corrector of the decoder will attempt to operate in its usual manner to correct this erroneous PCM word. However, it is possible that the erroneous word may be derived from one source whereas other words included in this de-interleaved block are derived from the other source. Typically, the error-correction operation attempts to reconstruct the erroneous PCM word by utilizing the error-correction word in conjunction with the remaining non-erroneous PCM words. If all of these words are derived from the same data source, there is no difficulty in reconstructing the correct PCM word. However, when some of the words are derived from one source and others are derived from the other source, there is no correlation therebetween, and the erroneous word cannot be reconstructed.

When the time-interleaved encoder/decoder of the aforementioned type is used in the example just described, the error-corrector therein attempts to "correct" the erroneous PCM word, even though such a "correction" cannot be carried out. As a result thereof, the "corrected" word is in error and, when converted back to analog form and reproduced by, for example, a loudspeaker, results in an undesired sound. This sound is disturbing and, preferably, should be avoided.

While the aforementioned undesired noise can be muted merely by carrying out a conventional muting operation whenever a change-over operation is carried out from one data source to another, this requires sensing the change-over operation. An additional, special connection must be made to, for example, the VTR, in order to derive a control signal therefrom which can be used to control the muting operation. Since such a control signal normally is not provided, this would require a special reconstruction of the VTR, which is not desired. Moreover, the production of a muting control signal frustrates the attempt to provide the PCM encoder/decoder as a mere "adapter", without special connections.

OBJECTS OF THE INVENTION

Therefore, it is an object of the present invention to provide an improved method and apparatus for processing a PCM signal so as to avoid the production of an undesired sound when that apparatus is supplied with data that is changed over from one data source to another.

Another object of this invention is to provide improved PCM signal processing apparatus which can, for example, be connected to a VTR as a simple adapter, without special connections thereto and without requiring the derivation of special control signals, so as to enable the VTR to be used as a PCM recorder.

A further object of this invention is to provide an improved method and apparatus for controlling an error-corrector in PCM signal processing apparatus so as to avoid erroneous operation of that error corrector when the PCM signal processing apparatus is supplied with PCM data that is changed over from one source to another.

An additional object of this invention is to provide improved PCM signal processing apparatus which is used with PCM data that is encoded in a time-interleaved error-correction format.

Various other objects, advantages and features of the present invention will become readily apparent from the ensuing detailed description, and the novel features will be particularly pointed out in the appended claims.

SUMMARY OF THE INVENTION

In accordance with this invention, a technique is provided for preventing errors in a PCM error-correction decoder of the type supplied with successive transmission blocks, each comprised of time-interleaved PCM, error-correction and error detection words, wherein the transmission blocks are supplied from a first data source and then a second data source to provide an error interval determined by the transition period from the first to the second source. In accordance with the technique of the instant invention, the presence of an error in a supplied transmission block is detected, and each of the time-interleaved words included in that transmission block is identified as being erroneous. Each transmission block is time de-interleaved to recover a de-interleaved block comprised of de-interleaved PCM and error correction words. An erroneous PCM word in the de-interleaved block is corrected as a function of the remaining non-erroneous PCM and error-correction words in that block. The correction of a PCM word in a de-interleaved block is inhibited if that block contains at least one word derived from the first data source and another word derived from the second data source. Thus, if the PCM words represent audio information, the production of an undesired sound due to an erroneous "correction" of the aforementioned PCM word is avoided.

BRIEF DESCRIPTION OF THE DRAWINGS

The following detailed description, given by way of example, will best be understood in conjunction with the accompanying drawings in which:

FIGS. 4A-4C are schematic timing diagrams which are useful in understanding the operation of the time interleave encoder;

FIGS. 5A-5E are timing diagrams which are useful in understanding the operation of the time de-interleave decoder;

FIG. 6 is a partial block, partial logic diagram of one embodiment of the present invention;

FIGS. 7A-7D are waveform diagrams of various signals produced by elements of the apparatus shown in FIG. 6;

FIGS. 8A-8E are timing diagrams which are useful in understanding one mode of operation of the apparatus shown in FIG. 6;

FIGS. 11A and 11B are useful in understanding the operation of the encoder shown in FIG. 9;

FIGS. 12A–12F are timing diagrams which are used to explain the operation of the decoder shown in FIG. 10; and FIGS. 13A–13C are timing diagrams which are used to explain another operation of the embodiment shown in FIG. 10.

DETAILED DESCRIPTION OF PREFERRED EMBODIMENTS

Figure 1:
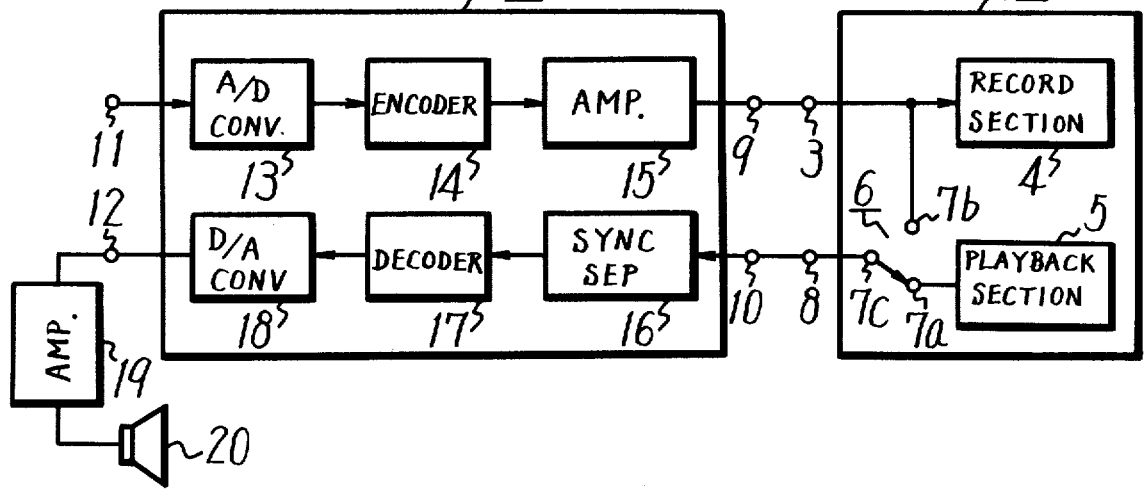
FIG. 1 is a block diagram of PCM signal processing apparatus in which the present invention finds ready application.

Referring now to the drawings, and in particular to FIG. 1, there is illustrated one embodiment of PCM signal processing apparatus 2 which can be used in conjunction with, for example, a video tape recorder (VTR) 1 so as to supply PCM-encoded audio signals to the VTR for recording and to receive reproduced PCM-encoded signals so as to generate corresponding audio sounds therefrom. VTR 1 may be of the helical scan type having, for example, two rotary heads (not shown) which record signals in parallel, skewed tracks along a magnetic tape, as is conventional. The VTR includes a record section 4, having suitable recording electronics, servo control systems, and the like, for controlling the recording of signals in the aforementioned tracks. VTR 1 also includes a playback section 5, including playback electronics, servo control systems, and the like, which operate to reproduce the signals that are recorded in the aforementioned tracks. Record section 4 is coupled to a record input terminal 3, the latter normally being supplied with typical video signals of the type which include periodic horizontal synchronizing signals, vertical synchronizing signals and video information signals. As is recognized, such a composite television signal includes high frequency components.

Playback section 5 is coupled to a playback output terminal 8 such that, when VTR 1 is utilized in a video signal playback mode, composite television signals are reproduced from the magnetic tape and supplied to output terminal 8. Usually, output terminal 8 is coupled to a television receiver, or monitor, to display video pictures corresponding to the reproduced video signals.

VTR 1 also is provided with a change-over switch 6 having fixed contacts 7a and 7b and a movable contact 7c selectively engageable with either of its fixed contacts. Movable contact 7c is coupled to output terminal 8 so as to supply to this output terminal the signals which are applied either to fixed contact 7a or to fixed contact 7b. As illustrated, fixed contact 7a is coupled to the output of playback section 5 and fixed contact 7b is coupled to input terminal 3. When change-over switch 6 is disposed in the configuration illustrated in FIG. 1, the signals which are reproduced by playback section 5 are supplied from contact 7a through movable contact 7c to output terminal 8. When switch 6 is changed over such that contact 7c engages fixed contact 7b, the signals normally supplied to record section 4 also are supplied to output terminal 8. Although illustrated herein as an electromechanical switch, it should be appreciated that change-over switch 6 may be an electronic switch such that its transition interval, that is, the interval during which movable contact 7c changes over between fixed contacts 7a and 7b, is relatively brief.

PCM signal processing apparatus 2 is coupled to terminals 3 and 8 of VTR 1 and functions as an adapter thereto. The PCM signal processing apparatus includes an encoding section to produce an encoded PCM signal, the output of this encoding section being coupled to input terminal 3 via a PCM output terminal 9. PCM signal processing apparatus 2 also includes a decoder section, this decoder section having a PCM input terminal 10 coupled to VTR output terminal 8. The purpose of the PCM signal processing apparatus is to encode an input analog signal, such as an audio signal, in PCM error-correction format, and to supply this PCM-encoded signal to VTR 1 for recording. As mentioned above, the VTR is adapted to record video signals which exhibit relatively higher frequencies. Furthermore, as is known, VTR's generally exhibit favorably high recording densities. Consequently, VTR 1 is particularly useful for recording PCM-encoded audio information.

When playback section 5 of VTR 1 reproduces the PCM-encoded audio information, the PCM-encoded signals are supplied via VTR output terminal 8 to PCM input terminal 10, such that the decoding section of PCM signal processing apparatus 2 decodes these recovered PCM signals, and re-converts the decoded signals back to audio analog form.

The encoding section of PCM signal processing apparatus 2 includes an analog input terminal 11, adapted to receive an input analog signal, such as an audio signal, this input terminal 11 being coupled to an analog-to-digital (A/D) converter 13, an encoder 14 and an amplifier 15, all connected in series, as illustrated. The output of amplifier 15 is coupled to PCM output terminal 9. A/D converter 13 is adapted to sample the analog audio signal supplied to audio input terminal 11 and to produce a corresponding multi-bit digital word corresponding thereto. Typically, this multi-bit digital word is a pulse code modulated (PCM) word. As one example thereof, each PCM word produced by A/D converter 13 is comprised of fourteen data bits.

If the input audio signal supplied to audio input terminal 11 is a stereophonic signal comprised of left-channel and right-channel signals, A/D converter 13 generates PCM words representing each sample of the left-channel and the right-channel signals. Although A/D converter 13 is shown in block form, it may be comprised of separate left-channel and right-channel filters, sample-and-hold circuits and analog-to-digital converters, such as described in aforementioned copending application Ser. No. 86,677. The output of A/D converter 13 is supplied to encoder 14 which functions to convert the PCM data supplied thereto into an error-correction format and, moreover, to carry out a time-base compression operation as to form "empty" or blank periods in the data stream into which are inserted various video synchronizing signals, such as periodic horizontal and vertical synchronizing signals. Encoder 14 thus serves to encode the PCM data in, for example, a time-interleaved error-correction format and, by inserting the aforementioned video synchronizing signals thereinto, to produce a simulated video signal. This simulated video signal is amplified by amplifier 15 and supplied, via PCM output terminal 9 and VTR input terminal 3, to record section 4 of VTR 1.

VTR 1 serves to record the PCM signals, which are encoded in error-correction format, and which include the various video synchronizing signals. It is appreciated that the VTR electronics interprets these encoded PCM signals as simulated video signals. Upon reproduction, these simulated video signals are supplied from playback section 5 through VTR output terminal 8 and PCM input terminal 10 to the decoding section of PCM signal processing apparatus 2. This decoding section is comprised of a synchronizing signal separator circuit 16, a decoder 17 and a digital-to-analog (D/A) converter 18, all connected in series, as illustrated. Synchronizing signal separator circuit 16 serves to separate the video synchronizing signals, i.e., the horizontal and vertical synchronizing signals, which had been inserted into the encoded PCM signals for recording. Thus, decoder 17 is supplied with encoded PCM signals having "empty" or blank data periods therein, these blank periods corresponding to the separated synchronizing signals.

Decoder 17 is compatible with encoder 14 and operates to time-base expand the encoded PCM signals back to their original time base; and, moreover, decoder 17 serves to recover the original PCM signals from the error-correction code. As will be described herein, encoder 14 functions to encode the PCM signals in the so-called time-interleaved format. Hence, decoder 17 function to time de-interleave these PCM signals. Furthermore, decoder 17 includes error correction and error compensation circuitry so as to correct errors that might be present in the recovered PCM signals, such as errors which may be due to dropout, noise, interference and the like. If such errors cannot be corrected, then an approximation of the erroneous PCM signal is produced by the error compensation circuitry, and this approximation is used to replace the erroneous PCM signal. Decoder 17 thus serves to reconstruct the original PCM signals which had been supplied to encoder 14 by A/D converter 13.

These reconstructed PCM signals are supplied to D/A converter 18 wherein they are re-converted back to their original analog audio signal level. For example, D/A converter 18 may re-convert the corrected/compensated PCM signals back to the original stereophonic left-channel and right-channel audio signals. These audio signals are supplied to audio output terminal 12, from which they are amplified in an audio amplifier 19 and used to drive loudspeaker 20 so as to reproduce audio sounds.

It may be seen that, by recording the original audio signals as digital signals, high fidelity and accurate reproduction of the original signals is obtained from speaker 20. Furthermore, since PCM signal processing apparatus 2 is connected merely to the usual VTR input and output terminals 3 and 8, apparatus 2 is provided merely as a simple adapter for the VTR. Special connections need not be made to the VTR; nor need special control signals be obtained therefrom in order to control or synchronize the operations of the VTR and the PCM signal processing apparatus.

When VTR 1 is used to record the encoded PCM data, the reproduced PCM signals are supplied from playback section 5 to PCM input terminal 8 when change-over switch 6 exhibits the configuration illustrated in FIG. 1. When this change-over switch is operated so as to engage movable contact 7c with fixed contact 7b, the encoded PCM signals produced at the PCM output terminal 9 are supplied to PCM input terminal 10. In this manner, speaker 20 may be used to monitor the PCM-encoded audio information which is being recorded by the record section of the VTR.

The present invention is directed to various features of PCM signal processing apparatus 2. Although this apparatus is illustrated as being used in conjunction with a VTR 1, it should be readily appreciated that, if desired, the PCM signal processing apparatus may be used with other devices, such as data transmitters, data receivers, and the like. Furthermore, and as will become apparent from the detailed discussion below, change-over switch 6 may be used to supply encoded PCM signals to the decoding section of PCM signal processing apparatus 2 either from a first or a second data source. In the application shown in FIG. 1, the first data source is comprised of VTR playback section 5; and the second data source is comprised of the encoder section included in the PCM signal processing apparatus. However, and as will be seen, other data sources may be used to supply encoded PCM data to the decoder section of PCM signal processing apparatus 2.

Figure 2:
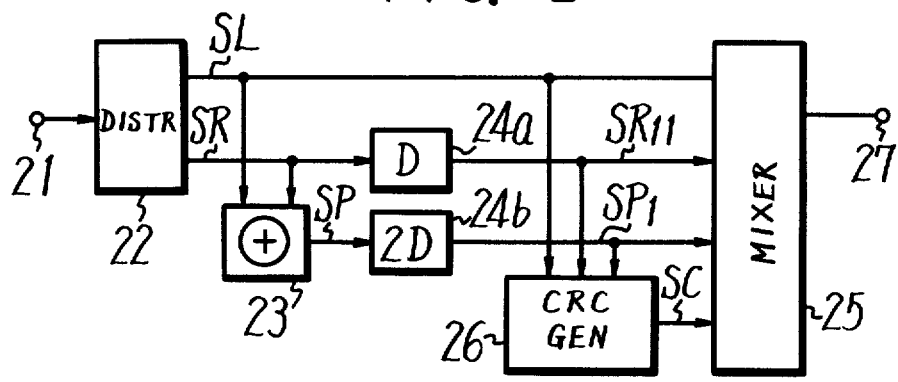
FIG. 2 is a block diagram of a typical time interleave encoder which can be used in the apparatus shown in FIG. 1.

One embodiment of a portion of encoder 14 is illustrated in FIG. 2. This illustrated embodiment is adapted to encode the PCM signals supplied from A/D converter 13 into the time-interleaved, error-correction format. That portion of encoder 14 which serves to time-compress the encoded PCM signals and to insert video synchronizing signals into blank periods produced thereby, is not shown. Nevertheless, the embodiment illustrated in FIG. 2 is referred to herein merely as the encoder.

The encoder shown in FIG. 2 is comprised of a distributor 22, an error-correction word generator 23, time-delay circuits 24a and 24b, a mixer 25 and an error detection code generator 26. Distributor 22 is coupled to an input terminal 21 and is adapted to receive successive PCM words which may, for example, be supplied thereto by A/D converter 13 in serial-by-word form. Each word may be comprised of a plurality of serial or parallel bits, such as fourteen bits. Distributor 22 functions as a demultiplexer to separate, or distribute, the single channel of successive PCM words supplied thereto into separate parallel channels referred to as the left-channel and the right-channel. Each channel thus is provided with a sequence, or series, of PCM words associated with left-channel and right-channel audio information, respectively. In FIG. 2, the sequence, or series, of left-channel PCM words is shown as left-channel SL, and the sequence, or series, of right-channel PCM words is shown as the right-channel SR. It will be explained below that successive data blocks are produced at the output of distributor 22 in successive time periods, these periods being referred to as transmission block periods, each being equal to the time period occupied by a transmission block. A transmission block, for the encoder shown in FIG. 2, is comprised of a left-channel word $L_i$ and a right-channel word $R_i$, both words being produced concurrently at the output of the distributor.

Left-channel SL and right-channel SR are coupled to error-correction word generator 23. As one example thereof, the error-correction word generator is a parity word generator and is adapted to sum the left-channel word generator and right-channel PCM words $L_i$ and $R_i$ provided in a data block at the output of distributor 22 in modulo 2 form. Thus, parity word generator 23 may comprise a conventional modulo 2 adder. The function of parity generator 23 is to generate a sequence, or series, of parity words SP, each parity word $P_i$ being produced in response to the modulo 2 addition of the left-channel and right-channel PCM words such that $P_i = L_i \oplus R_i$. The resultant parity word $P_i$ is seen to have the same number of bits (e.g. fourteen bits) as each of the left-channel and right-channel PCM words, and each parity word $P_i$ is particularly related to the PCM words $L_i$ and $R_i$ from which it is derived. Those of ordinary skill in the art will appreciate that the parity word $P_j$ may be used to reconstruct an erroneous PCM word, provided that the parity word and the other PCM word are correct. For example, if, during transmission, recording, reproduction and reception of the data block comprised of the PCM words $L_i$ and $R_i$ and the parity word $P_i$, an error is present in PCM word $L_i$, the correct version of PCM word $L_i$ may, nevertheless, be recovered as a function of the non-erroneous PCM word $R_i$ and the non-erroneous parity word $P_i$ in the recovered data block. Such error correction techniques are known to those of ordinary skill in the art and, in the interest of brevity, are not further described.

The PCM and parity words which constitute each data block are selectively time-delayed by time delay circuits 24a and 24b. In particular, the right-channel series SR and the parity series SP are supplied to time delay circuits 24a and 24b, respectively. The left-channel series SL is not supplied to a delay circuit in the embodiment shown in FIG. 2. Stated otherwise, this left-channel series is delayed by an amount corresponding to zero time delay. Time delay circuit 24a delays the right-channel series SR by a predetermined amount D; and time delay circuit 24b delays the parity series SP by a greater amount 2D. D is a time period equal to two transmission block intervals, wherein a transmission block interval is equal to the time interval occupied by a transmission block. A transmission block is similar to a data block, except that the particular words which constitute the transmission block are formed of the respectively-delayed PCM and parity words. That is, the transmission block is comprised of time-interleaved PCM and parity words. It is appreciated that time delay circuits 24a and 24b serve to time-interleave the respective words. For example, and as will be described further below, if the fourth data block is supplied to the time delay circuits, this fourth data block being comprised of PCM words $L_4$ and $R_4$ and parity word $P_4$, the transmission block then produced by the time delay circuits, that is, the time-interleaved transmission block comprised of time-interleaved words, may be represented as PCM words $L_4$ and $R_2$ and parity word $P_0$.

In FIG. 2, the resultant time-interleaved transmission block is comprised of the sequence, or series, of non-delayed left-channel PCM words SL, the delayed sequence, or series, of right-channel PCM words produced at the output of time delay circuit 24a, and identified as the delayed right-channel series $SR_{11}$, and the delayed sequence, or series, of parity words produced at the output of time delay circuit 24b, this delayed parity series being identified as $SP_1$. Of course, in any given transmission block, the PCM and parity words included therein may be identified as $L_i$, $R_{i-D}$ and $P_{i-2D}$.

The interleaved PCM and parity words included in each transmission block are supplied to error detection code generator 26. In one embodiment thereof, this error detection code generator is a cyclic redundancy code (CRC) generator. The use of error detecting codes, and particularly the CRC code, to detect the presence of one or more errors in a block of data words is well known. For example, the PCM and parity words included in a transmission block, and supplied to CRC generator 26, may be expressed as a polynomial over a Galois field, this polynomial being divided by a generation polynomial to obtain a remainder which is added to the transmission block as a CRC code word. That is, the CRC code word, together with the PCM and parity words, constitute the time-interleaved transmission block. During reproduction, when this transmission block is reproduced, a polynomial is formed of the reproduced PCM, parity and CRC words, and this polynomial is divided by the same generation polynomial which was used in the CRC generator. If no remainder is obtained by this division, then it is concluded that the reproduced transmission block does not contain any error. However, if a remainder is produced, then the transmission block contains at least one error. As will be described below, when an error is detected in the reproduced transmission block, a "pointer" or error flag associated with each PCM and parity word is set, thereby identifying each such word in the reproduced transmission block as being erroneous.

CRC generator 26 generates a sequence, or series, of error detection words, this error-detection series being identified as SC. It may be appreciated that a PCM word included in the left-channel series SL, together with a PCM word included in the delayed right-channel series $SR_{11}$, together with a parity word included in the delayed parity series $SP_1$, together with a word included in the error-detection series SC all appear concurrently. As shown in FIG. 2, these words, which exhibit a time-interleaved relationship with each other, constitute a transmission block and are supplied to mixer 25. The mixer functions as a multiplexer to serialize the words which are supplied thereto in parallel form. The output of mixer 25 is coupled to an output terminal 27 to supply successive transmission blocks thereto in serial form. If desired, the time occupied by a serialized time-interleaved transmission block produced by mixer 25 may be equal to a transmission block interval. This is attained if mixer 25 is supplied with a read-out clock signal of a frequency four times the frequency at which each 4-word transmission block is applied thereto.

The serialized transmission blocks provided at output terminal 27 may be supplied to a synchronizing mixer circuit (not shown) which serves to inert the usual video synchronizing signals into the stream of transmission blocks. Mixer 25 may operate to carry out a time-base compression of the transmission blocks applied thereto so as to provide blank periods into which the video synchronizing signals are inserted. The circuitry which can be used to carry out such a time-base compression is well known to those of ordinary skill in the art.

FIG. 4A represents successive data blocks formed of parallel PCM words $L_i$ and $R_i$ and parity word $P_i$. For example, at time $t_0$, the data block formed of $[L_0R_0P_0]$ is produced, at time $t_1$ the data block $[L_1R_1P_1]$ is produced, at time $t_2$ the data block $[L_2R_2P_2]$ is produced, and so on. Time delay circuits 24a and 24b impart selective delays of D and 2D to the right-channel PCM word and to the parity word, respectively. FIG. 4B represents the transmission block which is formed by this time-interleaving of the respective words. FIG. 4B also illustrates the CRC code word $C_i$ which is produced by CRC generator 26 in response to the PCM and parity words of each transmission block. Thus, at time $t_0$, the time-intereaved transmission block $[L_0R_{-2}P_{-4}C_0]$ is produced, at time $t_1$ the time-interleaved transmission block $[L_1R_{-1},P_{-3}C_1]$ is produced, at time $t_2$ the time-interleaved transmission block $[L_2R_0,P_{-2}C_2]$ is produced, and so on. It is seen that, in each transmission block, the respective words contained therein exhibit a time-interleaved relationship with respect to each other. In such a time-interleaved transmission block, there is little, if any, correlation between the words therein.

FIG. 4C represents the serialization of successive time-interleaved transmission blocks. It is appreciated that a blank period is formed between adjacent transmission blocks so as to accommodate video synchronizng signals that may be inserted therein.

Figure 3:
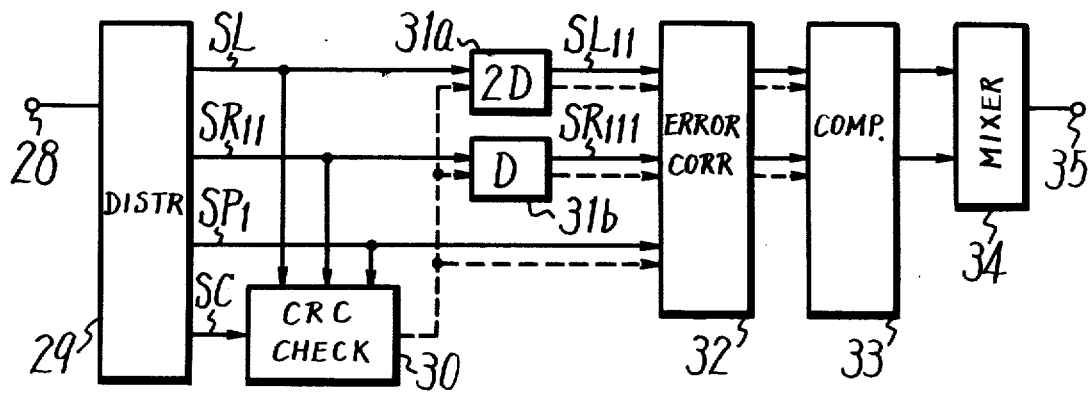
FIG. 3 is a block diagram of a typical de-interleave decoder which can be used with the apparatus of FIG. 1.

Turning now to FIG. 3, there is illustrated one embodiment of a decoder which is compatible with the encoder shown in FIG. 2. It is appreciated that the encoder of FIG. 2 is a time-interleaved error correction encoder. Hence, the decoder shown in FIG. 3 will be recognized as a time-interleaved error correction decoder that is particularly compatible with the FIG. 2 embodiment.

The decoder shown in FIG. 3 is comprised of a distributor 29, a error detector 30, time delay circuits 31a and 31b, an error correction circuit 32, a compensation circuit 33 and a mixer 34. Distributor 29 is coupled to an input terminal 28 to receive the serialized transmission blocks shown in FIG. 4C, which transmission blocks may be reproduced from a record medium or may be supplied thereto by any other suitable data source. It is appreciated that the serialized transmission blocks supplied to distributor 29 are substantially free of video synchronizing signals which may have been inserted into the original transmission blocks, the synchronizing signals having been removed by, for example, synchronizing signal separator circuit 16 (FIG. 1). Distributor 29 is adapted to distribute the respective PCM, parity and error-detection words into separate, parallel channels. The distributor thus may be comprised of a demultiplexer that operates in a manner which is inversely related to the operation of the multiplexer that may be included in mixer 25. Thus, distributor 29 serves to recover successive time-interleaved transmission blocks comprised of the left-channel series SL, right-channel series $SR_{11}$, the parity series $SP_1$ and the error-detection series SC. Such recovered transmission blocks may be represented by the timing diagram of FIG. 4B.

Error detection circuit 30 may comprise a CRC check circuit which is supplied with all of the interleaved words included in a received transmission block. The CRC check circuit operates in the manner discussed broadly above to detect the presence of an error in a received transmission block. In the event an error is detected, CRC check circuit 30 generates a "pointer" or error flag associated with each PCM and parity word contained in the received transmission block, thereby identifying, or designating, such words as being "erroneous". In one embodiment, CRC check circuit 30 does not determine which particular word (or words) is erroneous. For time-interleaved error correction purposes, it is sufficient merely to designate all the words in an erroneous transmission block as being in error. In another embodiment, such as the technique described in copending application Ser. No. 31,030, filed Apr. 18, 1979, the particular words which are erroneous are indicated.

Time delay circuit 31a is coupled to distributor 29 so as to impart a time delay of 2D to the left-channel PCM words included in left-channel series SL. As indicated by the broken line shown in FIG. 3, the "pointer" or error flag associated with these left-channel words likewise is delayed. Time delay circuit 31b is disposed to impart a time delay D to the right-channel PCM words included in right-channel series $SR_{11}$. The "pointer" or error flag associated with each right-channel PCM word also is delayed. The parity words included in parity series $SP_1$ are not delayed. It is appreciated that time delay circuits 31a and 31b provide time delays which are inversely related to the time delays imparted by time delay circuits 24a and 24b in the encoder of FIG. 2. These time delay circuits of the decoder serve to time de-interleave the respective words included in each received transmission block. Thus, at the output of the time delay circuits, the original timing relationship of the PCM and parity words which comprised each original data block is restored. The time de-interleaved data block is comprised of delayed left-channel series $SL_{11}$, delayed right-channel series $SR_{111}$, and non-delayed parity series $SP_1$. The "pointers" or error flags associated with the time de-interleaved words also are provided at the outputs of these time delay circuits.

Error correction circuit 32 is coupled to receive each successive time de-interleaved transmission block. For example, the error correction circuit may be a conventional parity decoder which is operable when the pointer or error flag associated with one PCM word supplied thereto is set. When operated, error correction circuit 32 sums the PCM and parity words included in the time de-interleaved data block, as by modulo 2 addition, to obtain a syndrome. This syndrome then is used to correct the erroneous PCM word included in the time de-interleaved data block. When the erroneous word is corrected, its associated pointer, or error flag, is cleared. As is conventional, error correction circuit 32 does not operate if the pointer, or error flag, associated with two of the words supplied thereto are set. Likewise, error correction circuit 32 does not operate if the parity word supplied thereto is identified as being erroneous. Of course, if the parity word is identified as being erroneous but the PCM words are not, there is no need to correct such PCM words.

The corrected PCM words are supplied from error correction circuit 32 to compensation circuit 33, together with their associated pointers, or error flags. If an erroneous PCM word is corrected, its error flag is cleared. However, if an erroneous PCM word is not corrected, for example, if the error flags associated with two words supplied to error correction circuit 32 are set, thus making the error correction process impossible, the error flags are not cleared. Compensation circuit 33 functions to approximate a correct value for the erroneous PCM word supplied thereto. As one example thereof, compensation circuit 33 may be of the "last value hold" type which serves to replace the erroneous PCM word with the last-received proper PCM word. For example, if PCM word $L_0$ was correct, but if the next-following PCM word $L_1$ cannot be corrected, then the previous value $L_0$ is retained and used as a replacement for the incorrect value $L_1$. Since the PCM words represent audio information, and since audio information varies at a relatively slow rate, satisfactory compensation is achieved by this type of approximation. In another embodiment, compensation circuit 33 may be of the so-called "interpolation" type, wherein the correct value of a PCM word is approximated by interpolating, or averaging, those correct PCM words which precede and follow it. For example, if PCM word $L_1$ is incorrect, but PCM words $L_0$ and $L_2$ are correct, then the interpolation-type compensation circuit obtains an average value from PCM words $L_0$ and $L_2$ to approximate the proper value of PCM word $L_1$.

The respective PCM words produced at the output of compensation circuit 33 are supplied to mixer 34 which serves to combine the left-channel and right-channel words supplied thereto into a single output channel. These serialized PCM words are supplied to an output terminal 35, from which they may be converted into analog form and used to drive a loudspeaker or other transducer.

Briefly, in operation, the decoder shown in FIG. 3 is supplied with serialized time-interleaved transmission blocks of the type shown in FIG. 4C. Distributor 29 de-serializes these transmission blocks to provide, at its respective outputs, the PCM, parity and CRC words shown in FIG. 4B. If any of the words included in the received transmission block is erroneous, CRC check circuit 30 sets an error signal associated with each word in that block. The time-interleaved PCM and parity words included in each received transmission block are time de-interleaved so as to restore the original timing relationship shown in FIG. 4A. If any of these de-interleaved words had been identified as being erroneous, such identifications remain.

Then, error correction circuit 32 functions to correct an erroneous PCM word included in a de-interleaved data block. As mentioned above, if two words in a de-interleaved data block are identified as being erroneous, such words are not corrected. Rather, compensation circuit 33 approximates the correct value of such "uncorrectable" PCM words. The resultant corrected/compensated left-channel and right-channel PCM words then are mixed, or merged, into a single channel by mixer 34 and supplied to output terminal 35.

It may be appreciated that the time-interleaved error correction code which is implemented by the encoder and decoder shown in FIGS. 2 and 3, respectively, is advantageous in that burst errors are dispersed. That is, errors of substantial length which might otherwise obliterate a sizable portion of the PCM data are minimized so as to permit error correction and compensation. The time-interleave error correction code reduces the possibility of recovering a de-interleaved data block containing two or more erroneous PCM words. For example, let it be assumed that the transmission blocks containing words $[L_0R_{-2}P_{-4}]$ and $[L_1R_{-1}P_{-3}]$ are detected, by using CRC code words $C_0$ and $C_1$, as being erroneous. Each word included in these transmission blocks thus is identified as being in error. Upon de-interleaving these words so as to recover the original data blocks, it will be seen that in the data block containing words $[L_{-3}R_{-3}P_{-3}]$, only parity word $P_{-3}$ is erroneous. In the de-interleaved data block $[L_{-2}R_{-2}P_{-2}]$, only PCM word $R_{-2}$ is erroneous. In the de-interleaved data block $[L_{-1}R_{-1}P_{-1}]$, only PCM word $R_{-1}$ is erroneous. In the data block $[L_0R_0P_0]$ only the PCM word $L_0$ is erroneous. In the data block $[L_1R_1P_1]$, only PCM word $L_1$ is erroneous. In each of these five de-interleaved data blocks, only one word contained therein is erroneous. Such single-error words are readily corrected in error correction circuit 32. Hence, a burst error of length D is readily correctable. If the burst error exceeds this length, then compensating circuit 33 functions to compensate erroneous PCM words which cannot be corrected by error correction circuit 32.

As mentioned above, the PCM signals supplied to the decoder shown in FIG. 3 may be reproduced from, for example, a VTR. Suitable PCM signals may be supplied to the decoder by any other suitable data source. In FIG. 1, change-over switch 6 represents one switching arrangement for supplying the PCM signals to the decoder either from playback section 5 of VTR 1 or from the encoding section of PCM signal processing apparatus 2. Stated generally, a change-over switching arrangement may be used to supply time-interleaved transmission blocks of PCM signals from either a first data source, referred to as source #1, or a second data source, referred to as source #2. In FIG. 1, playback section 5 corresponds to source #1, and the PCM encoding section of PCM signal processing apparatus 2 corresponds to source #2. Obviously, other suitable data sources may be used.

When change-over switch 6 is operated so as to change the particular data source that is coupled to the PCM decoder, such as by changing over from data source #1 to data source #2, an error interval is produced, this error interval having a time duration determined by the transition period of the change-over switch. That is, and as depicted in FIG. 5A, if commencement of the change-over operation occurs at time $t_0$, the error interval, or transition period, extends from time $t_0$ to time $t_1$. At time $t_1$, change-over switch 6 fully couples source #2 to the PCM decoder. In FIG. 5A, this error interval, or transition period, is represented by the cross-hatched section. At the beginning of this error interval, transmission blocks derived from data source #1 are supplied to the decoder; and at the completion of this error interval, transmission blocks derived from data source #2 are supplied to the decoder. In the embodiment shown in FIG. 1, decoder 17 is supplied with transmission blocks from playback section 5 prior to the error interval; and the decoder is supplied with transmission blocks from the encoding section of PCM signal processing apparatus 2 following the error interval.

Let it be assumed that the error interval is equal to or less than one transmission block interval. FIG. 5B is a timing diagram representing successive time-interleaved transmission blocks that are produced at the outputs of distributor 29. Those transmission blocks which are derived from source #1 are represented in the absence of parentheses, and those transmission blocks which are derived from source #2, that is, those transmission blocks which are reproduced at the outputs of the distributor following the commencement of the transition period, are indicated with parentheses. If it is assumed that the error interval is equal to or less than a transmission block interval, then only one transmission block will be erroneous—i.e., the transmission block that is received immediately following the initiation of the transition period. FIG. 5B identifies those words in this transmission block, which are considered to be errononeous, by the superscript "x". More particularly, CRC check circuit 30 sets the error flag associated with each of words $L_4$, $R_2$ and $P_0$. It may be appreciated that signal dropout during this data error interval will result in the setting of such error flags.

FIG. 5C is a timing diagram representing the recovered data blocks which are obtained by de-interleaving the transmission blocks shown in FIG. 5B. As shown, and as is understood, the interleave/de-interleave technique serves to disperse the erroneous words which are contained in each interleaved transmission block, whereby only a signal word is identified as being erroneous in various ones of the de-interleaved data blocks. Thus, in the de-interleaved data block $[P_0R_0L_0]$, only the parity word $P_0$ is identified as being erroneous. In the de-interleaved data block $[P_1R_1L_1]$, no words are identified as being erroneous. In the de-interleaved data block $[P_2R_2L_2]$, only PCM word $R_2$ is identified as being erroneous. In the de-interleaved data block $[P_3R_3L_3]$, no words are identified as being erroneous. Finally, in the de-interleaved data block $[P_4R_4L_4]$, only PCM word $L_4$ is identified as being erroneous. Since, at most, only a single word in any de-interleaved data block is identified as being erroneous, it is recognized that error correction circuit 32 functions so as to correct the erroneous PCM words.

However, it is recognized that, during the period 2D, four de-interleaved data blocks are provided with words which are derived from both source #1 and source #2. Let the block intervals during which such de-interleaved data blocks are provided be represented as block intervals $TB_1$, $TB_2$, $TB_3$ and $TB_4$, respectively. In the data blocks occupying block intervals $TB_1$ and $TB_2$, the PCM words are derived from source #1, but the parity words are derived from source #2. In the data blocks occupying block intervals $TB_3$ and $TB_4$, only the left-channel PCM words are derived from source #1. The remaining PCM and parity words are derived from source #2. It will, therefore, be appreciated that, if error correction circuit 32 operates during block interval $TB_3$ so as to "correct" the erroneous right-channel PCM word $R_2$, a proper error correction cannot be achieved. This is because the error correction for PCM word $R_2$ will be based upon parity word $P_2$ and PCM word $L_2$. But, since the data source from which PCM word $L_2$ is derived differs from the data source from which parity word $P_2$ and PCM word $R_2$ are derived, the lack of correlation therebetween will prevent erroneous PCM word $R_2$ from being corrected properly. Moreover, in the error-correction operation carried out by error correction circuit 32, the resultant "corrected" word $R_2$ may be so distorted that, when converted to an analog signal to drive loudspeaker 20, a sharp or otherwise undesirable sound will be produced.

That is, because of the error interval caused by the operation of change-over switch 6, errors will be dispersed throughout a number of de-interleaved data blocks. Error correction circuit 32 will operate in its normal manner in an attempt to correct individual erroneous PCM words. However, the normal operation of this error correction circuit during block interval $TB_3$ will produce an undesired result. It is a purpose of the present invention to prevent this result from occurring without requiring any special connections and without requiring special control signals which may be produced either by the change-over switching arrangement or by the VTR with which it is used. More particularly, the present invention inhibits an improper error correction operation from being carried out on de-interleaved data blocks which contain words that are derived from both source #1 and source #2.

One embodiment of the present invention is illustrated in FIG. 6. Those elements in FIG. 6 which are the same as the elements described above with respect to FIG. 3 are identified by the same reference numerals. In FIG. 6, distributor 29 is not shown. Nevertheless, it is appreciated that this distributor is used to provide the time-interleaved left-channel series SL, right-channel series $SR_{11}$, parity series $SP_1$ and CRC series SC. In addition to those elements which have been described above, FIG. 6 includes a counter 37, a detector 38, a pulse generator 39, an OR gate 36, a NOR gate 40, a syndrome forming circuit 41, an AND gate 42 and a monostable multivibrator 48. Counter 37 is coupled to the output of CRC check circuit 30 to count each pointer, or error signal, that is produced by the CRC check circuit whenever an error in a received transmission block is detected. Although not shown particularly herein, it should be recognized that the CRC check circuit produces an error flag pulse at the end of each transmission block interval. This pulse is converted by suitable circuitry (not shown) so as to be present throughout substantially the entire transmission block interval with which it is associated. This may be obtained by, for example, triggering a one-shot circuit of suitable time constant with the error flag pulse and, moreover, supplying the respective series $SL_{11}$, $SR_{111}$ and $SP_1$ through a one-block delay circuit. The output of the one-shot circuit thus will coincide with the outputs of each of these 1-block delayed series.

The output of counter 37 is coupled to detector 38, the latter being adapted to detect when counter 37 attains a predetermined count. As one example thereof, when the count of counter 37 exceeds a count of 2, detector 38 detects this condition and triggers pulse generator 39. Pulse generator 39 may be similar to the aforementioned one-shot circuit and, when triggered, generates a simulated pointer, or error flag. OR gate 36 includes one input coupled to CRC check circuit 30 and another input connected to pulse generator 39 to supply either the actual error flag produced by the CRC check circuit or the simulated error flag produced by the pulse generator.

NOR gate 40 is provided with one input connected to receive the pointer, or error flag, associated with each de-interleaved left-channel PCM word included in each de-interleaved data block, another input connected to receive the pointer, or error flag, associated with each de-interleaved right-channel PCM word included in each de-interleaved data block, and another input connected to receive the pointer, or error flag, associated with each de-interleaved parity word in each de-interleaved data block. This latter input is seen to be coupled to the output of OR gate 36 and, thus, receives either the actual error flag produced by CRC check circuit 30 or the simulated error flag produced by pulse generator 39. It may be appreciated that NOR gate 40 functions as a coincidence circuit to detect when all of these error flags are cleared. The OR gate produces a no-error signal $\overline{SD}$, which is a binary "1" when no error flags are detected, and which is a binary "0" when one or more error flags are detected. This no-error signal $\overline{SD}$ is coupled to one input of AND gate 42. The other input of this AND gate is coupled to the output of a syndrome forming circuit 41.

The syndrome forming circuit is supplied with the PCM and parity words contained in each de-interleaved data block to produce a syndrome by the modulo-2 addition of such words. More particularly, syndrome forming circuit 41 forms the syndrome $P_i \oplus R_i \oplus L_i$. In the absence of any errors in the de-interleaved data block, and if all of the words contained in that data block are derived from the same source, the generated syndrome corresponds to a predetermined value. However, if an error is present in any of the de-interleaved words, or if the data block contains words which are derived from different data sources, then the resultant syndrome will not correspond to this predetermined value. The generated syndrome is supplied to error correction circuit 32 and is used therein to correct an erroneous PCM word. Furthermore, syndrome forming circuit 41 produces a syndrome signal SS which is a binary "1" whenever the generated syndrome differs from its predetermined value, and is a binary "0" whenever the generated syndrome corresponds to the predetermined value. This syndrome signal SS is supplied to AND gate 42 wherein the coincidence between the syndrome signal SS and the no-error signal $\overline{SD}$ is detected. As is appreciated, AND gate 42 produces an output when a de-interleaved data block contains no errors, but the generated syndrome for that de-interleaved data block differs from the aforementioned predetermined value.

Monostable multivibrator 48 is coupled to AND gate 42 and is triggered in response to the output generated by the AND gate to produce an inhibit signal $P_c$. This inhibit signal is supplied to error correction circuit 32 and functions to inhibit the operation of the error correction circuit for the duration of the inhibit signal. Preferably, monostable multivibrator 48 exhibits a time constant such that inhibit signal $P_c$ exhibits a duration corresponding to two data block intervals. When error correction circuit 32 is inhibited, an error correction operation is not performed. Accordingly, if any of the PCM words then supplied to the error correction circuit are identified as being erroneous, such words are not corrected. Compensating circuit 33 then carries out the aforementioned compensating, or approximating, operation so as to replace the erroneous PCM word with an approximated value thereof.

In operation, let it be assumed that the time-interleaved transmission blocks supplied to the decoder shown in FIG. 6 are derived from data source #1 and then, following the data error interval shown in FIG. 5A, are derived from data source #2. The respective words contained in each time-interleaved transmission block will appear as shown in FIG. 5B, with the erroneous data words being identified by the superscript "x". The de-interleaved words constituting each de-interleaved data block will appear as shown in FIG. 5C. As before, those words which are derived from data source #1 are represented without parentheses, and those words which are derived from data source #2 are represented by parentheses. FIG. 5D represents a signal SD which would be produced if NOR gate 40 is replaced by an OR gate, and FIG. 7A represents the no-error signal $\overline{SD}$ produced at the output of NOR gate 40. FIGS. 5E and 7B represent the syndrome signal SS produced by syndrome forming circuit 41 whenever the syndrome generated in response to the de-interleaved PCM and parity words differs from the predetermined value. It is seen that the generated syndrome differs from the predetermined value whenever a de-interleaved word contains an error, and whenever a de-interleaved data block is formed of some words which are derived from one data source and other words which are derived from the other data source. This is expected because, in these conditions, there is no correlation among all of the words in the de-interleaved data block.

In the absence of the present invention, error correction circuit 32 would operate whenever signals SD and SS (FIGS. 5D and 5E) coincide. Such an operation will result in the improper "correction" of PCM word $R_2$ during block interval $TB_3$. This improper correction is avoided by the embodiment shown in FIG. 6. In particular, AND gate 42 produces the output signal shown in FIG. 7C. The trailing edge, or negative transition, of the first pulse produced by AND gate 42 serves to trigger monostable multivibrator 48 to produce inhibit pulse $P_c$ for a duration equal to two data block intervals. FIG. 7D illustrates that inhibit signal $P_c$ is produced throughout data block intervals $TB_3$ and $TB_4$. Thus, error correction circuit 32 is inhibited from operation during these data block intervals. Thus, during data block interval $TB_3$, PCM word $R_2$ is not corrected and, moreover, during the next-following data block interval $TB_4$, no correction is made, even though, during this data block interval, the generated syndrome differs from its predetermined value. Hence, the undesired sound which would otherwise be produced by the erroneous "correction" of PCM word $R_2$ during data block interval $TB_3$ is avoided. Rather, since PCM word $R_2$ is identified as being erroneous, and since it is not corrected by error correction circuit 32, compensating circuit 33 functions to replace this erroneous PCM word with an approximation thereof. For example, the preceding PCM word $R_1$, which is indicated as being correct, is used again as an approximation for PCM word $R_2$.

In the foregoing example, it may be sufficient that inhibit signal $P_c$ exhibit a duration equal to only a single data block period $TB_3$. However, it is preferred that the inhibit signal extend over two data block intervals in order to inhibit the erroneous "correction" of, for example, PCM word $R_3$ in the event that the data error interval encompasses two transmission blocks. Thus, NOR gate 40, syndrome forming circuit 41, AND gate 42 and monostable multivibrator 48 serve to inhibit error correction circuit 32 in the event that the data error interval is equal to $\frac{1}{2}$D or D.

Now, let it be assumed that the data error interval is greater than D. As a particular example, it is assumed that this data error interval is sufficient to produce errors in three successive interleaved transmission blocks.

FIG. 8A is similar to FIG. 5C in that it illustrates the de-interleaved words contained in the de-interleaved data blocks which are produced immediately prior, during and following the aforementioned data error interval. As before, parentheses identify those words which are derived from data source #2, and the superscript "x" identifies those de-interleaved words which are erroneous. It is appreciated that all of the words included in the received transmission blocks $[P_0R_2L_4]$, $[P_1R_3L_5]$ and $[P_2R_4L_6]$ are identified as being erroneous because such transmission blocks are received during the data error interval.

FIG. 8B illustrates the pointers, or error flags, generated by CRC check circuit 30. As mentioned above, these pointers are produced at the end of each transmission block interval that is detected as being erroneous. FIG. 8C represents the waveform of no-error signal $\overline{SD}$. Since at least one word in each de-interleaved data block during data block intervals $TB_1 \ldots TB_7$ is erroneous, NOR gate 40 remains at its binary "0" level during these intervals. This is because, during each such interval, at least one error flag is supplied to the NOR gate. FIG. 8D represents the syndrome signal SS produced by syndrome forming circuit 41. During data block intervals $TB_1 \ldots TB_7$, the syndrome generated by the syndrome forming circuit differs from its predetermined value either because at least one de-interleaved word during each interval is erroneous or because some de-interleaved words during these intervals are derived from one data source and other words are derived from the other source.

When CRC check circuit 30 produces the third error flag at the end of data block interval $TB_3$, the count of counter 37 is incremented so as to exceed the predetermined count of 2. Detector 38 detects that counter 37 now exceeds this predetermined count and, therefore, triggers pulse generator 39 to produce the simulated error flag shown in FIG. 8E. This simulated error flag is produced after the third error flag is generated and, thus, the simulated error flag extends throughout the data block interval TB₄. This simulated error flag is supplied through OR gate 36 and, thus, is associated with parity word P₃ included in the de-interleaved data block [P₃R₃L₃].

From FIG. 8A, it is seen that, since the parity words included in the de-interleaved data blocks [P₀R₀L₀] and [P₁R₁L₁] are identified as being erroneous, error correction circuit 32 does not function to correct the PCM words in these blocks. Furthermore, in the data block [P₂R₂L₂], since two words are identified as being erroneous, the error correction circuit does not operate. However, in data block [P₃R₃L₃], only the PCM word R₃ is identified as being erroneous. Hence, if error correction circuit 32 is not inhibited, it would attempt to erroneously "correct" PCM word R₃. Such a correction operation should be inhibited because, as is apparent, this de-interleaved data block contains PCM word L₃ derived from data source #1, and the remaining words derived from data source #2. Since there is no correlation therebetween, any "error correction" will be erroneous. However, by generating the simulated error flag during data block interval TB₄, as shown in FIG. 8E, error correction circuit 32 interprets parity word P₃, which is associated with this simulated error flag, as being erroneous. Hence, error correction circuit 32 interprets de-interleaved data block [P₃R₃L₃] as containing two erroneous words and, therefore, the error correction circuit does not operate to carry out an error correction operation.

The remaining de-interleaved data blocks which are supplied to error correction circuit 32 all contain words which are derived from the same data source, that is, data source #2. Hence, for those data blocks which contain only a single erroneous word, error correction circuit 32 functions in its normal manner to correct that word.

It is appreciated that, when error correction circuit 32 is inhibited from operating, compensating circuit 33 serves to replace uncorrectable PCM words with approximations thereof in the manner described above.

Thus, it is seen that, when the error interval encompasses three or more transmission blocks, an erroneous error correction operation, which might otherwise be carried out, is avoided. In the embodiment described above, the simulated error flag produced by pulse generator 39 is associated with the de-interleaved parity word. Although this simulated error flag may be associated with a de-interleaved PCM word, this may frustrate an error compensation operation in some instances and, therefore, is not preferred.

Figure 9:
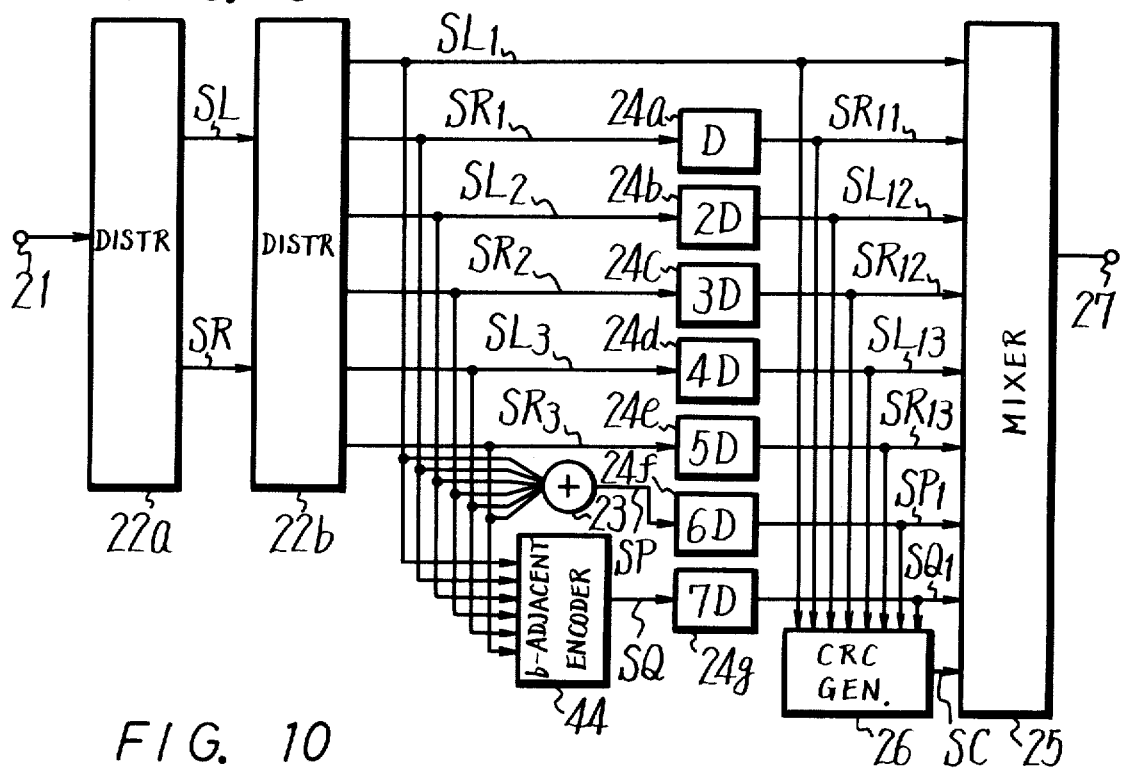
FIG. 9 is a block diagram of another encoder which can be used with the present invention.

Another embodiment of a time-interleaved encoder is illustrated in FIG. 9. This encoder is adpated to distribute the left-channel and right-channel PCM words into a plurality of left-channel and right-channel series. Accordingly, the encoder includes a distributor 22a, which may be similar to aforedescribed distributor 22, to distribute a single channel of PCM words into separate left-channel and right-channel sequences SL and SR, respectively. These sequences are supplied to a further distributor 22b which, in turn, produces the left-channel series SL₁, SL₂ and SL₃ in response to the sequence SL, and produces the right-channel series SR₁, SR₂ and SR₃ in response to the sequence SR. For example, if the left-channel sequence SL is comprised of left-channel PCM words L₋₂, L₋₁, L₋₀, L₁, L₂, L₃, L₄, L₅ and L₆, and if the right-channel sequence is comprised of right-channel PCM words R₋₂, R₋₁, R₋₀, R₁, R₂, R₃, R₄, R₅ and R₆, distributor 22b serves to distribute such sequential words into the following parallel-by-word data blocks [L₋₂R₋₂L₋₁R₋₁L₀R₀], [L₁R₁L₂R₂L₃R₃] and [L₄R₄L₅R₅L₆R₆]. It may be appreciated that each word in each of these data blocks is provided in a respective one of series SL₁, SR₁, SL₂, SR₂, SL₃ and SR₃. Thus, each data block is formed of three left-channel words and three right-channel words.

The encoder shown in FIG. 9 also includes parity word generator 23 having a plurality of inputs, each coupled to receive a respective word included in each data block, this parity word generator including, for example, a modulo 2 adder, similar to aforedescribed parity word generator 23. Still further, another error-correction word generator 44 is connected to receive each of the words contained in a data block. Error correction word generator 44 may be, for example, a b-adjacent encoder which generates a parity-type word related to the PCM words supplied thereto. For example, let it be assumed that the data block [L₁R₁L₂R₂L₃R₃] is supplied by distributor 22 to encoder 44. This encoder generates a parity word Q₁ which may be expressed as:

$$Q_1 = T^6 L_1 \oplus T^5 R_1 \oplus T^4 L_2 \oplus T^3 R_2 \oplus T^2 L_3 \oplus T R_3$$

wherein T is a matrix of a d-order generating polynominal G(x), d≧3. If d=3, the generating polynominal G(x) is a reduced polynomial on the Galois field GF(2), this reduced polynomial being expressed as G(x)=1+x+x³, so that T may be expressed as:

$$T = \begin{bmatrix} 001 \\ 101 \\ 010 \end{bmatrix}$$

In the expression representing the parity word Q₁, T, T², T³, T⁴ and T⁵ all differ from each other.

The respective PCM words, together with the P-parity word generated by parity word generator 23 and the Q-parity word generated by b-adjacent encoder 44, all are supplied to respective time delay circuits 24a . . . 24g. These time delay circuits impart respective time delays to the words supplied thereto so as to time-interleave the PCM and parity words. More particularly, left-channel series SL₁ is delayed by OD (i.e., it is not delayed), right-channel series SR₁ is delayed by the amount D, left-channel series SL₂ is delayed by the amount 2D, right-channel series SR₂ is delayed by the amount 3D, left-channel series SL₃ is delayed by the amount 4D, right-channel series SR₃ is delayed by the amount 5D, P-parity series SP is delayed by the amount 6D and Q-parity series SQ is delayed by the amount 7D. In these time delay circuits, the delayed amount D is equal to the time occupied by two successive data blocks. Furthermore, and as is appreciated, the minimum difference between any two time delays is seen to be equal to D.

The time-interleaved PCM and parity words produced at the outputs of the delay circuits are supplied to mixer 25 and, additionally, to CRC generator 26. The CRC generator may be similar to the aforedescribed CRC generator to produce a CRC series SC. Each CRC word included in the series SC is derived from the time-interleaved PCM and parity words supplied to the CRC generator. It will be recognized that these time-interleaved PCM and parity words, together with the generated CRC words, constitute a time-interleaved transmission block. In the illustrated example, each such time-interleaved transmission block is comprised of n PCM words, two error-correction (or parity) words and one CRC code word. In this particular example, n=6. However, and as will be appreciated, n may be any other desirable integer.

Mixer 25 is similar to the aforedescribed mixer in that it serializes each time-interleaved transmission block supplied thereto. Successive, serialized transmission blocks are produced at output terminal 27 and may be supplied to a time-base compression circuit for the formation of blank periods in the serialized transmission blocks, each blank period having a video synchronizing signal inserted thereinto.

The encoder shown in FIG. 9 is similar to the encoder described in aforementioned copending application Ser. No. 86,677.

If desired, error-correction word generator 44 may be another conventional generator and need not be limited solely to a b-adjacent encoder. Regardless of the particular type of error-correction word generators which are used, it should be recognized that, by providing two parity words in each transmission block, the decoder has the capability of correcting two erroneous PCM words which may be contained in each received data block. This capability, coupled with the dispersal of burst errors due to the time-interleaved code results in an enhanced error correction scheme.

In the embodiment shown in FIG. 9, mixer 25 produces a serialized transmission block of the type detected in FIG. 11A. If D is the time delay equal, effectively, to two data block intervals, then, at the time that distributor 22b supplies the data block $[L_1R_1L_2R_2L_3R_3]$, the time-interleaved transmission block produced at the output of mixer 25 is $[L_1R_{-5}L_{-14}R_{-16}L_{-21}R_{-27}P_{-35}Q_{-41}C_1]$. The simulated video signal which is produced in response to this serialized transmission block appears as shown in FIG. 11B. It is seen that each serialized transmission block corresponds to a "line interval" of video information, the transmission block itself being identified by reference numeral 46, being preceded by a data synchronizing signal 45, being followed by a white-level reference signal 47, and being included in the line interval defined by horizontal synchronizing signal HD. PCM-encoded signals having the waveforms shown in FIG. 11B are easily recorded by a conventional VTR.

Figure 10:
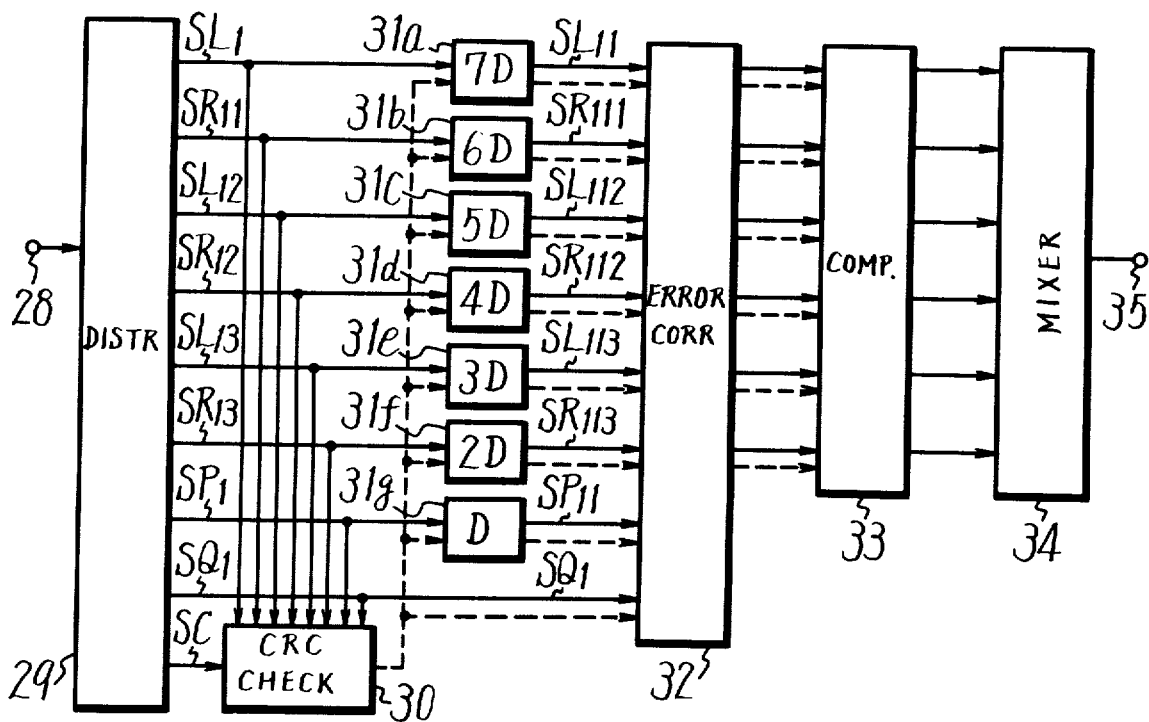
FIG. 10 is a block diagram of another time de-interleave decoder which can be used with the present invention.

One embodiment of a decoder which is compatible with the encoder shown in FIG. 9 and which is readily adapted to decode each serially-received transmission block shown in FIG. 11A is illustrated in FIG. 10. This decoder is comprised of a distributor 29, a CRC check circuit 30, time delay circuits 31a . . . 31g, error correction circuit 32, error compensation circuit 33 and mixer 34. Distributor 29 is similar to the aforedescribed distributor shown in FIG. 3, except that the distributor of FIG. 10 serves to demultiplex each received time-interleaved transmission block into n parallel PCM words, two parity words and one CRC word. In the example described herein, n=6. Thus, the transmission block shown in FIG. 11A is supplied, in parallel-by-word format, at the multi-channel outputs of distributor 29, these outputs corresponding to series $SL_1$, $SR_{11}$, $SL_{12}$, $SR_{12}$, $SL_{13}$, $SR_{13}$, $SP_1$, $SQ_1$ and SC, respectively.

All of the time-interleaved words which are contained in the received transmission block are supplied to CRC check circuit 30. This CRC check circuit functions in a manner similar to that described hereinabove to designate, or identify, all of the words contained in the received time-interleaved transmission block as being erroneous. That is, the CRC check circuit detects an error in a received transmission block and, when an error is detected, the pointer, or error flag, associated with each word contained in the received transmission block is set.

Time delay circuits 31a . . . 31g are adapted to impart time delays to the time-interleaved words included in each received transmission block, which time delays are inversely related to the time delays which were imparted by the encoder shown in FIG. 9. Thus, each left-channel PCM word included in series $SL_1$, which words had not been subjected to any time delay in the encoder, now are subjected to a maximum time delay 7D by time delay circuit 31a. The right-channel PCM words included in series $SR_{11}$, which had been subjected to an encoder time delay of D time units now are subjected to a time delay of 6D by time delay circuit 31b. In similar fashion, series $SL_{12}$ is subjected to a time delay of 5D by time delay circuit 31c, series $SR_{12}$ is subjected to a time delay of 4D by time delay circuit 31d, series $SL_{13}$ is subjected to a time delay of 3D by time delay circuit 31e, series $SR_{13}$ is subjected to a time delay of 2D by time delay circuit 31f, series $SP_1$ is subjected to a time delay of D by time delay circuit 31g, and series $SQ_1$ is subjected to a time delay of OD. Thus, the original time-aligned data blocks, comprised of time de-interleaved PCM and parity words, are produced sequentially at the outputs of the time delay circuits. Each time de-interleaved block is comprised of delayed series $SL_{11}$, delayed series $SR_{111}$, delayed series $SL_{112}$, delayed series $SR_{112}$, delayed series $SL_{113}$, delayed series $SR_{113}$, delayed series $SP_{11}$ and non-delayed parity series $SQ_1$, each time de-interleaved word in these series being accompanied by its respective pointer or error flag which also is provided at the output of each time delay circuit.

Error correction circuit 32 is coupled to receive the de-interleaved PCM and parity words included in each data block, together with the error flags associated with such de-interleaved words. The error correction circuit may be of the type described in copending application Ser. No. 195,625. It will be appreciated that, since the error correction circuit is supplied with two parity words $P_i$ and $Q_i$, two erroneous PCM words included in a de-interleaved data block may be corrected. For example, error correction circuit 32 may form a first syndrome from the PCM words and the P-parity word included in the de-interleaved data block; and it may also form a second syndrome from the PCM words and the Q-parity word included in that data block. These syndromes then can be used to correct two erroneous PCM words. Thus, a burst error having a maximum time-length of 2D, that is, a burst error which affects four successive transmission blocks, may be corrected.

If three or more PCM words in a de-interleaved data block are erroneous, of if the parity words in a data block are erroneous, error correction circuit 32 does not operate to correct the PCM words. Accordingly, those PCM words which are erroneous and whose error flags are set are supplied to error compensation circuit 33. This error compensation circuit may be similar to the aforedescribed error compensation circuit which functions to approximate a correct value for an uncorrectable PCM word. The corrected/compensated PCM words then are supplied by compensation circuit 33 to mixer 34 whereat they are multiplexed into a single PCM channel and supplied to output terminal 35. This single channel of PCM words then may be converted into analog form and used, for example, to drive loudspeaker 20.

The present invention, one embodiment having been described hereinabove with respect to FIG. 6, is readily adapted for use with the time-interleaved encoder/decoder arrangement shown in FIGS. 9 and 10. The embodiment of FIG. 6 may be modified such that syndrome forming circuit 41 is constructed as two separate syndrome forming circuits, one for forming the syndrome in response to the P-parity words and the other for forming the syndrome in response to the Q-parity words. NOR gate 40 is supplied with the error flag associated with each PCM and parity word, and monostable multivibrator 48 is provided with a time constant having a period of, for example, ten data block intervals. Also, pulse generator 39 generates a simulated error flag having a duration of, for example, nine data block intervals.

The manner in which the present invention operates with the decoder embodiment shown in FIG. 10 now will be briefly described. FIG. 12A is a timing diagram representing successive de-interleaved data blocks. The series of de-interleaved parity and PCM words are shown as the series $SQ_1$, $SP_{11}$, $SR_{113}$, $SL_{113}$, $SR_{112}$, $SL_{112}$, $SR_{111}$ and $SL_{111}$, each series having its associated time delay illustrated thereon. The solid lines represent those words which are derived from data source #1, and the broken lines represent those de-interleaved words which have been derived from data source #2. As before, it is assumed that time-interleaved transmission blocks first are supplied to the decoder from data source #1 and then, during a transition period which establishes the error interval represented by the cross-hatched areas in FIG. 12A, successive transmission blocks are supplied from data source #2. In the example shown in FIG. 12A, it is assumed that the data error interval affects only a single, received time-interleaved transmission block. FIG. 12A illustrates the particular data blocks into which the errors due to this transition interval are dispersed. For convenience, the parity series $SQ_1$ is used as a reference because this series is not delayed by the decoder shown in FIG. 10.

FIG. 12B illustrates the no-error signal $\overline{SD}$ produced by, for example, NOR gate 40 in response to successive de-interleaved data blocks. FIG. 12C illustrates the syndrome signal $SS_1$ formed by the syndrome forming circuit in response to the de-interleaved P-parity series $SP_{11}$. It is seen that this syndrome signal $SS_1$ commences at the beginning of period $TD_2$, that is, this syndrome signal commences with the error in the delayed P-parity series. FIG. 12D illustrates the syndrome signal $SS_2$ formed by the syndrome forming circuit in response to the Q-parity series $SQ_1$. It is seen that this syndrome signal $SS_2$ commences at the beginning of period $TD_1$, that is, this syndrome signal commences with the detected error in the de-interleaved Q-parity series $SQ_1$. Both syndrome signal $SS_1$ and syndrome signal $SS_2$ terminate when the last error in the de-interleaved data blocks is detected, that is, the syndrome signals terminate after the error in the delayed series $SL_{111}$ is detected. It is assumed that the only errors which are present in the de-interleaved data blocks are those represented by the cross-hatched areas.

When the embodiment shown in FIG. 6 is used with the decoder of FIG. 10, it is assumed that AND gate 42 is supplied with syndrome signal $SS_1$ (FIG. 12C) and with no-error signal $\overline{SD}$ (FIG. 12A). The resultant output of the AND gate thus appears as shown in FIG. 12E. The initial negative-going transition in the output of the AND gate (FIG. 12A) is used to trigger monostable multivibrator 48 which generates the inhibit pulse $P_c$ shown in FIG. 12F. It is assumed that the time constant of the monostable multivibrator is equal to five periods TD, that is, it is equal to the time interval occupied by ten successive data blocks. Thus, error correction circuit 32 is inhibited by this inhibit pulse $P_c$ from the time that the first de-interleaved erroneous PCM word is received in series $SR_{113}$ until the time that the last de-interleaved erroneous PCM word (included in series $SL_{111}$) is received. From FIG. 12A, it is seen that, during the duration of inhibit pulse $P_c$, each de-interleaved data block is comprised of at least one PCM word derived from data source #1 and the remaining PCM words derived from data source #2. It is recalled that, when a data block contains PCM words derived from different data sources, there is no correlation among all of such PCM words and, therefore, error correction thereof cannot be carried out properly. To avoid an erroneous "correction", the inhibit pulse $P_c$ prevents error correction circuit 32 from operating during the interval that such mixed PCM words are present.

From FIGS. 12A and 12F, it is appreciated that, during periods $TD_1$ and $TD_2$, no error correction is needed because, during these periods, the only errors which are present are errors in the parity words. During periods $TD_3 \ldots TD_7$, errors are present in one PCM word contained in those de-interleaved data blocks which are produced during the first half of each such period. During normal operation, error correction circuit 32 operates to correct such erroneous PCM words. However, each de-interleaved data block which is produced during the intervals $TD_3 \ldots TD_7$ includes at least one PCM word derived from source #1 and the remaining PCM words derived from source #2. Since there is no correlation between the data sources, an erroneous PCM word in such data blocks cannot be corrected. Accordingly, to avoid an erroneous "correction" of such PCM words, error correction circuit 32 is inhibited by inhibit pulse $P_c$ during these periods $TD_3 \ldots TD_7$. Nevertheless, even though an erroneous PCM word is not corrected by error correction circuit 32, a close approximation of the correct PCM word is substituted therefor by error compensation circuit 33.

During period $TD_8$, the PCM word included in series $SL_{111}$ is erroneous. However, in the de-interleaved data block which contains this PCM word, all of the remaining PCM and parity words are derived from the same data source, that is, all of the words included in this data block are derived from data source #2. Hence, the erroneous PCM word included in series $SL_{111}$ may be corrected by error correction circuit 32 in accordance with the usual parity or b-adjacent error correction operation.

Although not shown herein, it will be recognized that, if the data error interval exhibits a length equal to D, for example, no-error signal $\overline{SD}$ remains at its binary "0" level throughout the interval defined by syndrome signal $SS_2$. Hence, the output of AND gate 42, as shown in FIG. 12E, likewise remains at its binary "0" level. Consequently, monostable multivibrator 48 is not triggered, and the inhibit pulse $P_c$ is not produced.

Nevertheless, the occurrence of a data error interval equal to D or more is detected by the combination of counter 37 and detector 38 (FIG. 6), described above. For example, let it be assumed that the data error interval is equal to 2.5D, as represented in FIG. 13A. CRC check circuit 30 thus detects errors in each of five successive received transmission blocks.

Now, if error correction circuit 32 is not inhibited, it is seen that, in the de-interleaved data block produced during the latter half of period $TD_3$, the PCM word included in series $SR_{113}$ is in error and is derived from data source #2, but all of the remaining PCM words are correct and are derived from data source #1. The error correction circuit would attempt to correct this erroneous PCM word in series $SR_{113}$ during the latter half of period $TD_3$. However, this error correction operation would be improper because of the mixture of data sources from which the words included in this de-interleaved data block are derived. Likewise, in the de-interleaved data block received during the latter half of period $TD_4$, the PCM words included in series $SR_{113}$ and $SL_{113}$ both are erroneous, but none of the remaining words in this de-interleaved data block are in error. Error correction circuit 32 normally operates to correct these two erroneous PCM words in response to the P-parity and Q-parity words as well as the remaining non-erroneous PCM words included in this data block. However, such an operation will produce an erroneous "correction" of these PCM words because of the fact that these erroneous words are derived from data source #2, but the remaining PCM words included in this data block are derived from data source #1. The lack of correlation between the data sources prevents proper error correction. The foregoing erroneous error-correction operation will be carried out for the two PCM words which are identified as being erroneous in the de-interleaved data blocks which are produced during the latter half of each of periods $TD_5$, $TD_6$ and $TD_7$.

The present invention operates to prevent such erroneous error correction operations during these periods. Thus, when CRC check circuit 30 detects the presence of an error in the fifth received transmission block, so as to increment counter 37 to a count of five at a delayed time 2.5D following the reception of the first erroneous transmission block, detector 38 detects this predetermined count to trigger pulse generator 39. The pulse generator generates a simulated error flag having a duration that terminates at the delayed time 7D. This simulated error flag is associated by a suitable OR gate, such as an OR gate analogous to aforedescribed OR gate 36, with the Q-parity words, as shown in FIG. 13B. Hence, during the latter half of each of periods $TD_3$, $TD_4$, $TD_5$, $TD_6$ and $TD_7$, the Q-parity words are identified as being erroneous. During the latter half of each of these periods, two PCM words in each de-interleaved data block also are identified as being erroneous. Now, since the Q-parity word also is erroneous for each of these data blocks, error correction circuit 32 cannot operate to correct both erroneous PCM words. Hence, these PCM words are not corrected and, therefore, an otherwise improper correction operation is inhibited. The uncorrectable PCM words are, nevertheless, replaced by close approximations thereof as a result of the operation of compensation circuit 33. Accordingly, each de-interleaved data block which contains some words derived from data source #1 and other words derived from data source #2 is not error-corrected. This avoids an erroneous error correction operation and, therefore, prevents the generation of an undesired sound due to an erroneously-corrected PCM word.

FIG. 13C represents a modification of the invention, when used with the decoder of FIG. 10, in that the simulated error flag generated by pulse generator 39 is added to the error flag associated with each word contained in the sixth received transmission block. This has the effect of "enlarging" each error flag so as to extend for a duration of 3D rather than the actual duration of 2.5D. It is seen, from FIG. 13C, that each de-interleaved data block produced during periods $TD_3$, $TD_4$, $TD_5$, $TD_6$ and $TD_7$ contains three erroneous PCM words. Although error correction circuit 32 is capable of correcting two erroneous PCM words in each de-interleaved data block, the presence of three erroneous PCM words prevents the error correction circuit from operating.

In the embodiment of the invention described hereinabove with respect to FIG. 13A, it may be stated, generally, that when CRC check circuit 30 detects the presence of an error in each of five successive, received transmission blocks, the Q-parity word included in the next-following m transmission block is designated as being erroneous. In the example shown in FIG. 13A, the Q-parity word is designated as being erroneous in the next-following nine transmission blocks. This results in "enlarging" the error flag associated with the Q-parity words in the manner shown in FIG. 13B. That is, the error flag associated with the Q-parity words is set during the reception of fourteen successive transmission blocks. Consequently, in each de-interleaved transmission block that contains some words derived from data source #1 and other words derived from data source #2, at least three words in each such block are identified as being erroneous. It is recalled that error correction circuit 32 cannot operate to correct more than two erroneous PCM words in any de-interleaved data block.

While the present invention has been particularly shown and described with reference to certain preferred embodiments, it should be readily apparent to those of ordinary skill in the art that various changes and modifications in form and details may be made without departing from the spirit and scope of the invention. For example, in the foregoing embodiments, the basic or minimum time delay unit D has been assumed to be equal to the time period occupied by two transmission or data blocks. That is, D has been assumed to be equal to two transmission block intervals. If desired, other suitable delays may be used so as to increase the correctable length of the burst error interval which might be produced as a result of the transition between data sources. As another modification, in the embodiments shown in FIGS. 9 and 10, the PCM series $SL_1 \ldots SR_3$ and the parity series SP may be interleaved to produce an interleaved sub-block, and the respective PCM and parity words in each time-interleaved sub-block may be further interleaved with the parity series SQ to produce the resultant time-interleaved transmission block, such as described more particularly in copending application Ser. No. 195,625. Furthermore, although parity words have been described as the error-correction words included in each transmission block, it will be appreciated by those of ordinary skill in the art that error correction words derived by other error-correction techniques may be used.

Therefore, it is intended that the appended claims be interpreted as including the foregoing as well as various other changes and modifications.

What is claimed is:

1. A method of preventing errors in a PCM error-correction decoder of the type supplied with successive transmission blocks, each comprised of time-interleaved PCM, error-correction and error detection words, wherein said transmission blocks are supplied from one data source and then from a different data source to produce an error interval determined by the transition period from said one source to said different source, said method comprising the steps of detecting if a supplied transmission block contains an error; identifying as being erroneous each of the time-interleaved words included in the supplied transmission block which has been detected as containing an error, time de-interleaving each supplied transmission block to recover a de-interleaved block comprised of de-interleaved PCM and error-correction words; correcting an erroneous PCM word in said de-interleaved block as a function of the remaining non-erroneous PCM and error-correction words in that de-interleaved block; and inhibiting the correction of a PCM word in a de-interleaved block if said block contains at least one word derived from said one data source and another word derived from said different data source.

2. The method of claim 1 wherein said step of correcting an erroneous PCM word includes generating a syndrome from said PCM and error-correction words in said de-interleaved block; and wherein said step of inhibiting the correction of a PCM word comprises sensing if said syndrome differs from a predetermined value, sensing the absence of an erroneous word in said de-interleaved block, and producing an inhibit signal of predetermined duration in response to the sensed absence of an erroneous word when said syndrome differs from said predetermined value to inhibit the correction of PCM words for the duration of said inhibit signal.

3. The method of claim 2 wherein each de-interleaved block is comprised of two PCM words and one error-correction word; and wherein said predetermined duration of said inhibit signal is equal to the time interval occupied by two successive de-interleaved blocks.

4. The method of claim 1 wherein each de-interleaved block is comprised of n PCM word and two error-correction words such that two erroneous PCM words in said de-interleaved block are correctable as a function of the remaining non-erroneous PCM words and the non-erroneous two error-correction words.

5. The method of claim 4 wherein said step of inhibiting the correction of a PCM word comprises generating a syndrome from said PCM words and a predetermined one of said error-correction words; sensing if said syndrome differs from a predetermined value; sensing the absence of any erroneous words in said de-interleaved block; and producing an inhibit signal of a duration substantially equal to the time interval occupied by a predetermined number of successive de-interleaved blocks in response to the sensed absence of any erroneous words when said syndrome differs from said predetermined value.

6. The method of claim 1 wherein said step of inhibiting the correction of a PCM word comprises counting the number of successive transmission blocks which contain errors; detecting if said count exceeds a predetermined value; designating an error-correction word in at least the next-supplied transmission block as being erroneous, whereby at least two words in a de-interleaved block containing words derived from said one and said different data sources are identified as being erroneous; and inhibiting the correction of a PCM word contained in a de-interleaved block having at least two erroneous words therein.

7. The method of claim 6 wherein said step of time de-interleaving each supplied transmission block comprises delaying each word contained in said supplied transmission block by a respectively different time delay, the minimum difference between two respective time delays being equal to D, wherein D is the time period occupied by a predetermined number of successive transmission blocks, said predetermined value being at least equal to said predetermined number.

8. The method of claim 4 wherein said step of time de-interleaving each supplied transmission block comprises delaying each word contained in said supplied transmission block by a respectively different time delay, the minimum difference between two respective time delays being equal to the time period occupied by a predetermined number of successive transmission blocks; and wherein said step of inhibiting the correction of a PCM word comprises counting the number of successive transmission blocks which contain errors, detecting if said count exceeds said predetermined number, designating an error correction word in each of the next m transmision blocks as being erroneous (m=the number of transmission blocks supplied during the largest of said time delays), whereby at least three words in a de-interleaved block containing words derived from said one and said different data sources are identified as being erroneous, and inhibiting the correction of a PCM word contained in a de-interleaved block having at least three erroneous words therein.

9. The method of claim 4 wherein said step of time de-interleaving each supplied transmission block comprises delaying each word contained in said supplied transmission block by a respectively different time delay, the minimum difference between two respective time delays being equal to the time period occupied by a predetermined number of successive transmission blocks; and wherein said step of inhibiting the correction of a PCM word comprises counting the number of successive transmission blocks which contain errors, detecting if said count exceeds said predetermined number, designating all of the words in the next-supplied transmission block as being erroneous, whereby at least three words in a de-interleaved block containing words derived from said one and said different data sources are identified as being erroneous, and inhibiting the correction of a PCM word contained in a de-interleaved block having at least three erroneous words therein.

10. PCM signal processing apparatus adapted to receive successive transmission blocks, each comprised of time-interleaved PCM, error-correction and error detection words, from either of first or second selectable data sources, means for changing over the selection of said data sources from one to the other to establish an error interval during the transition period that said selection of data sources is changed over, said apparatus comprising detecting means responsive to said error detection words for detecting if a received transmission block contains an error; error identifying means for identifying as being erroneous each of the time-interleaved words included in the received transmission block which has been detected as containing an error; de-interleaving means for time de-interleaving each received transmission block to recover a de-interleaved block comprised of de-interleaved PCM and error-correction words, erroneous ones of said de-interleaved words being respectively identified; error correcting means coupled to said de-interleaving means for correcting an erroneous PCM word in said de-interleaved block as a function of the remaining non-erroneous PCM and error-correction words in that de-interleaved block; means for indicating when the de-interleaved block contains at least one word derived from said first data source and another word derived from said second data source; and inhibit means for inhibiting said error correcting means if said de-interleaved block supplied thereto contains at least one word derived from said first data source and another word derived from said second data source.

11. The apparatus of claim 10 wherein said error correcting means includes syndrome generating means for generating a syndrome from said PCM and error-correction words in said de-interleaved block; wherein said means for detecting includes means for producing a syndrome signal if said syndrome differs from a predetermined value, means coupled to said de-interleaving means for producing a no-error signal if none of the words in said de-interleaved block are erroneous, and means for detecting the concurrence of said syndrome and no-error signals; and wherein said inhibit means comprises means for producing an inhibit signal of predetermined duration in response to said concurrence of said syndrome and no-error signals, whereby the operation of said error correcting means is inhibited for the duration of said inhibit signal.

12. The apparatus of claim 11 wherein said error identifying means produces a respective error signal associated with each PCM and error-correction word in a received transmission block that has been detected as being erroneous, the respective error signals remaining associated with the de-interleaved PCM and error-correction words; and wherein said means for producing a no-error signal comprises coincidence means supplied with the error signals associated with the PCM and error-correction words of each de-interleaved block to detect the absence of error signals associated with said words.

13. The apparatus of claim 12, wherein said coincidence means comprises a NOR gate.

14. The apparatus of claim 12 wherein said means for indicating comprises AND gate means coupled to receive said syndrome signal and said no-error signal; and said inhibit means comprises pulse generating means coupled to the output of said AND gate means.

15. The apparatus of claim 14 wherein each de-interleaved block is comprised of two PCM words and one error-correction word; and wherein said pulse generating means includes monostable multivibrator means having a time constant equal to the time interval occupied by two successive de-interleaved blocks.

16. The apparatus of claim 11 wherein each de-interleaved block includes two error-correction words; wherein said syndrome generating means generates a syndrome from said PCM words and a predetermined one of said error-correction words, and wherein said means for producing an inhibit signal produces said inhibit signal of a duration substantially equal to the time interval occupied by a predetermined number of successive de-interleaved blocks.

17. The apparatus of claim 10 wherein said error correcting means does not operate if two or more words in a de-interleaved block supplied thereto are identified as being erroneous; and wherein said inhibit means comprises counting means for counting the number of successive transmission blocks which contain errors; means for detecting if said count exceeds a predetermined value; and error designating means for designating an error-correction word in at least the next received transmission block as being erroneous, whereby at least two words in a de-interleaved block that contains words which are derived from said first and second data sources are identified as being erroneous.

18. The apparatus of claim 17 wherein said de-interleaving means comprises plural delay means, each having a respectively different time delay and each delaying a respective word contained in said received transmission block, the minimum difference between two respective time delays being equal to D, wherein D is the time period occupied by a predetermined number of successive transmission blocks; and wherein said predetermined value is at least equal to said predetermined number.

19. The apparatus of claim 18 wherein D is the time period occupied by two successive transmission blocks.

20. The apparatus of claim 10 wherein said error correcting means does not operate if three or more words in a de-interleaved block supplied thereto are identified as being erroneous; and wherein said inhibit means comprises counting means for counting the number of successive transmission blocks which contain errors; means for detecting if said count exceeds a predetermined value; and error designating means for designating an error-correction word in a predetermined number of the next received transmission blocks as being erroneous, whereby at least three words in each de-interleaved block that contains words which are derived from said first and second data sources are identified as being erroneous.

21. PCM signal processing apparatus adapted to receive successive transmission blocks, each comprised of time-interleaved PCM, error-correction and error detection words, from either of first or second selectable data sources, means for changing over the selection of said data sources from one to the other to establish an error interval during the transition period that said selection of data sources is changed over, said apparatus comprising detecting means responsive to said error detection words for detecting if a received transmission block contains an error; error identifying means for identifying as being erroneous each of the time-interleaved words included in the received transmission block which has been detected as containing an error; de-interleaving means for time de-interleaving each received transmission block to recover a de-interleaved block comprised of de-interleaved PCM and error-correction words, erroneous ones of said de-interleaved words being respectively identified; error correcting means coupled to said de-interleaving means and operative to correct an erroneous PCM word in said de-interleaved block as a function of the remaining PCM and error-correction words in that de-interleaved block, provided that the total number of erroneous words in that block is less than a predetermined amount; syndrome generating means for generating a syndrome from said PCM and error-correction words in said de-interleaved block; means for producing a syndrome signal if said syndrome differs from a predetermined value; means coupled to said de-interleaving means for producing a no-error signal if none of the words in said de-interleaved blocks are erroneous; means for supplying an inhibit signal of predetermined duration to said error correcting means in response to the concurrence of said syndrome and no-error signals, whereby the operation of said error correcting means is inhibited for the duration of said inhibit signal; counting means for counting the number of successive transmission blocks which contain errors; means for detecting if said count exceeds a predetermined value representing a predetermined duration of said error interval; and error designating means responsive to said means for detecting for designating an error-correction word in a predetermined number of the next received transmission blocks as being erroneous, whereby the number of words identified as erroneous in each de-interleaved block that contains words which are derived from said first and second data source is at least equal to said predetermined amount.

* * * * *